(12) United States Patent
Matsumura

(10) Patent No.: US 10,402,108 B2
(45) Date of Patent: Sep. 3, 2019

(54) EFFICIENT CONTROL OF DATA STORAGE AREAS BASED ON A SIZE OF COMPRESSED DATA TO BE WRITTEN

(71) Applicant: FUJITSU LIMITED, Kawasaki-shi, Kanagawa (JP)

(72) Inventor: Shinichiro Matsumura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/862,756

(22) Filed: Jan. 5, 2018

(65) Prior Publication Data

US 2018/0210667 A1 Jul. 26, 2018

(30) Foreign Application Priority Data

Jan. 20, 2017 (JP) .................................. 2017-008165
Sep. 13, 2017 (JP) .................................. 2017-175670

(51) Int. Cl.
G06F 3/06 (2006.01)
G06F 12/02 (2006.01)

(52) U.S. Cl.
CPC .......... *G06F 3/0619* (2013.01); *G06F 3/0608* (2013.01); *G06F 3/0638* (2013.01); *G06F 3/0641* (2013.01); *G06F 3/0643* (2013.01); *G06F 3/0679* (2013.01); *G06F 3/0688* (2013.01); *G06F 3/0689* (2013.01); *G06F 12/023* (2013.01); *G06F 12/0253* (2013.01); *G06F 2212/401* (2013.01)

(58) Field of Classification Search
CPC .... G06F 3/0619; G06F 12/023; G06F 3/0679; G06F 3/0638; G06F 12/0253; G06F 2212/401; G06F 3/0688; G06F 3/0608; G06F 3/0689; G06F 3/0641; G06F 3/0643

USPC ......................................................... 711/170
See application file for complete search history.

(56) References Cited

U.S. PATENT DOCUMENTS

2010/0058015 A1* 3/2010 Tokoro ................ G06F 11/1456
  711/162
2014/0281168 A1* 9/2014 Koseki .................. G06F 11/108
  711/103

FOREIGN PATENT DOCUMENTS

JP 9-123539 5/1997
JP 2001-43115 2/2001

* cited by examiner

*Primary Examiner* — Hua J Song
(74) *Attorney, Agent, or Firm* — Fujitsu Patent Center

(57) ABSTRACT

Management information is provided to control a storage including storage-areas so that each storage-area includes a set of data-areas allocated from each storage-area and each set of data-areas has a data-area size that is a different integer multiple of an access unit of the storage. Logical address information stores information identifying a data-area into which target-data obtained by compressing data has been written, in association with a logical address of the data. Upon reception of the data and the logical address of the data, the apparatus identifies the management information corresponding to a data-area size greater than or equal to a size of the target-data, writes the target-data into an unused data-area of one of the sets of data-areas corresponding to the identified management information, and stores, in the logical address information, information identifying a physical address of the unused data-area in association with the logical address of the data.

11 Claims, 23 Drawing Sheets

FIG. 4

| | BLOCK MAP TABLE | ~311 |

| LOGICAL ADDRESS | PHYSICAL STORAGE CONTAINER ID | PHYSICAL STORAGE SLOT NUMBER | |
|---|---|---|---|
| 0 [KB] | 2 | 0 | ~401-0 |
| 4 [KB] | 6 | 0 | ~401-1 |
| 8 [KB] | 4 | 0 | ~401-2 |
| 12 [KB] | 1 | 5 | ~401-3 |
| 16 [KB] | 3 | 0 | ~401-4 |
| 20 [KB] | 1 | 0 | ~401-5 |
| 24 [KB] | 2 | 1 | ~401-6 |
| 28 [KB] | 6 | 1 | ~401-7 |
| 32 [KB] | 4 | 2 | ~401-8 |
| 36 [KB] | 4 | 3 | ~401-9 |
| 40 [KB] | NOT YET WRITTEN | | ~401-10 |
| 44 [KB] | NOT YET WRITTEN | | ~401-11 |
| 48 [KB] | 2 | 2 | ~401-12 |

FIG. 17

EFFICIENT CONTROL OF DATA STORAGE AREAS BASED ON A SIZE OF COMPRESSED DATA TO BE WRITTEN

CROSS-REFERENCE TO RELATED APPLICATIONS

This application is based upon and claims the benefit of priority of the prior Japanese Patent Application Nos. 2017-175670, filed on Sep. 13, 2017, and 2017-8165, filed on Jan. 20, 2017, the entire contents of which are incorporated herein by reference.

FIELD

The embodiments discussed herein are related to efficient control of storage areas based on a size of compressed data to be written.

BACKGROUND

A garbage collection process for collecting unused data areas and reserving the unused areas as consecutive data areas has been developed. For example, as a related art, image data is divided into data segments of the same size, which is smaller than or equal to the size of each of a plurality of partitioned storage areas of a hard disk, and is compressed. As another related art, the following technique has been developed: a candidate of a file to be compressed is presented to the user based on the file management information and the user setting, a specified file is selected as a file to be compressed and is compressed, and the original file is overwritten by the compressed file.

Japanese Laid-open Patent Publication No. 9-123539 and Japanese Laid-open Patent Publication No. 2001-43115 discuss the above-described technologies.

SUMMARY

According to an aspect of the invention, an apparatus stores management information including first and second management information, and logical address information used to control a storage including a first storage area and a second storage area, where the first storage area includes a first set of data areas allocated from the first storage area, each of which has a first size that is an integer multiple of an access unit of the storage, the second storage area includes a second set of data areas allocated from the second storage area, each of which has a second size that is an integer multiple of the access unit of the storage and differs from the first size, the first management information includes first identification information that identifies a physical address of each of the first set of data areas in the first storage area and first status information indicating a usage status of each of the first set of data areas, the second management information including second identification information that identifies a physical address of each of the second set of data areas in the second storage area and second status information indicating a usage status of each of the second set of data areas, the logical address information stores target identification information identifying a target data area that is a data area among the first and second sets of data areas, into which target data obtained by compressing write data to be written into the storage has been written, in association with a logical address of the write data. Upon reception of the write data and a logical address of the write data, the apparatus identifies target management information that is one of the first and second management information corresponding to a size greater than or equal to a size of the target data, and writes the target data into an unused data area of a target set of data areas that is one of the first and second sets of data areas corresponding to a target storage area, where the target storage area is one of the first and second storage areas corresponding to the identified target management information. The apparatus stores, in the logical address information, information identifying a physical address of the unused data area in association with a logical address of the write data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of the details of information stored in a block map table;

FIG. 17 illustrates an example of physical release (part 1) of a physical release unit area in a container area;

DESCRIPTION OF EMBODIMENTS

However, according to the existing technologies, when the compressed data are written, in order from front to back, into the storage area of the storage without dividing the storage area, a garbage collection process is performed, and the processing load on the central processing unit (CPU) and the processing load on the storage increase. The increase in load decreases the performance of the storage during a garbage collection process. In addition, when compressed data is written into a data area obtained by dividing the storage area of the storage into data areas of equal size, the area having no data written thereinto increases in the above-described data area with decreasing size of the compressed data. Note that even when plural pieces of data of the same size are compressed, the sizes of the compressed data differ from one another depending on the content of the data. Consequently, the storage area of the storage is not efficiently used.

It is desirable to efficiently use a storage into which compressed data are written.

A storage control apparatus and a storage control program according to embodiments of the present disclosure are described in detail below with reference to the drawings.

First Embodiment

Figure 1:
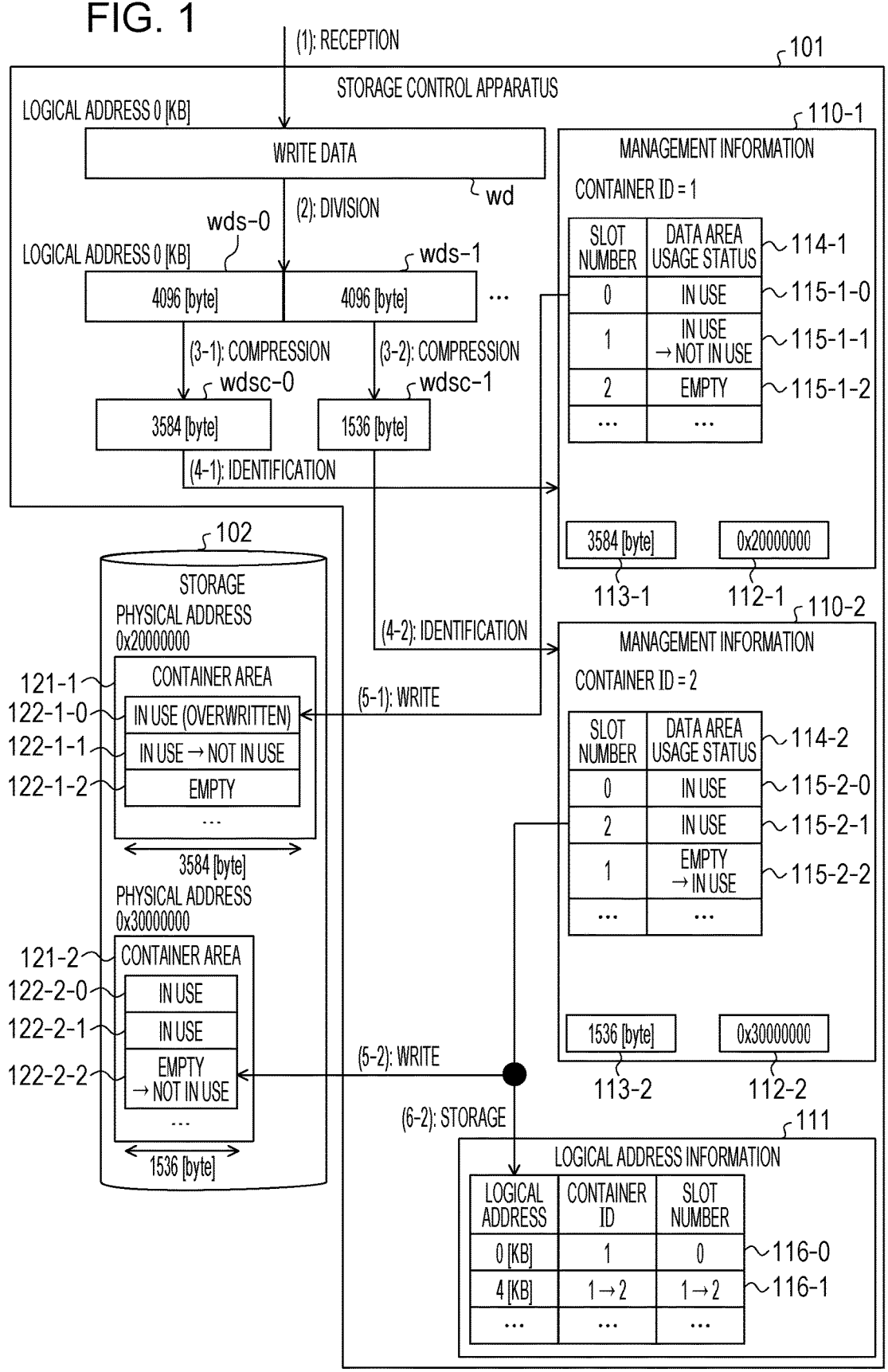
FIG. 1 illustrates an example of the operation performed by a storage control apparatus according to a first embodiment.

FIG. 1 illustrates an example of the operation performed by a storage control apparatus 101 according to a first embodiment. The storage control apparatus 101 is a computer that controls a storage 102. More specifically, the storage control apparatus 101 provides the storage area of the storage 102 to the user. The storage control apparatus 101 functions as, for example, a server. The storage control apparatus 101 increases the usage efficiency of the storage 102 by dividing the data from the user, compressing each of the divided data, and writing each of the compressed data into the storage 102.

At this time, when the storage area of the storage 102 is a storage area accessed by a head, for example, when the storage 102 is a hard disk drive (HDD), it is desirable that each of the compressed data be written, in order from front to back, into the storage area. The reason why it is desirable to write each of the compressed data, in order from front to back, into the storage area is because the HDD accesses data at a higher speed as the data is on the outer zone of the magnetic disk and, in addition, sequential access is made since the consecutive areas are accessed. Furthermore, by writing data so that the compressed data are packed without a gap therebetween, the usage efficiency of the storage 102 is improved.

When data overwriting occurs upon writing data, in order from front to back, into the storage area, the old data already written to the storage may be marked as unused. Thereafter, new data may be written into the storage. This operation increases the unused area on the storage. Increased unused area decreases the use efficiency of the storage. Accordingly, to release the unused area, a garbage collection process may be performed. In the garbage collection process, the data other than the unused data are moved forward so as to be packed with no gap therebetween and are rewritten.

However, when the garbage collection process is performed, the data are relocated. As a result, the load on the storage increases, and the load on the CPU increases due to the garbage collection process. In addition, for data relocation, the memory is used as a temporary storage area of the data read from the storage. Accordingly, the memory is temporarily consumed. As the load increases, the performance of the storage during the garbage collection process decreases.

In order not to avoid the garbage collection process, the compressed data may be written into the data area obtained by dividing the storage area of the storage into sub-areas of the same size. However, even when a plurality of data of the same size are compressed, the sizes of the compressed data differ from one another depending on the content of the data. Therefore, when compressed data is written into a data area obtained by dividing the storage area of the storage into data areas of the same size, an area having no data written thereinto increases in the above-described data area with decreasing size of the compressed data. Consequently, the storage area of the storage is not efficiently used.

Therefore, according to the present embodiment, by using pieces of management information each used to manage one of area groups each including areas of the same size (one of different integer multiples of the access unit of the storage 102), a data area of a size greater than or equal to the size of compressed write data is identified, and the aforementioned compressed data is written into the aforementioned data area. Such a technique is described below.

An example of the operation performed by the storage control apparatus 101 is described below with reference to FIG. 1. The storage control apparatus 101 controls the storage 102. At this time, the storage control apparatus 101 accesses management information 110 and logical address information 111. The management information 110 and the logical address information 111 are stored in, for example, the memory of the storage control apparatus 101. However, the management information 110 and the logical address information 111 may be stored in the storage area of another apparatus.

The management information 110 has the following two pieces of information corresponding to the first size and the second size which are integer multiples of the size of the access unit of the storage 102: information that identifies the physical address of each of the plurality of data areas which are allocated from the storage area of the storage 102 and which have the first size or the second size, and information that indicates the usage status of each of the data areas. The size of a data area may be any integer multiple of the size of the access unit. In the example illustrated in FIG. 1, the size of the access unit is 512 (bytes). In the example illustrated in FIG. 1, the storage control apparatus 101 accesses management information 110-1 serving as first management information corresponding to the first size and further accesses management information 110-2 serving as second management information corresponding to the second size that differs from the first size. In the example illustrated in FIG. 1, the first size is 3584 (bytes) which is seven times 512 (bytes), and the second size is 1536 (bytes) which is three times 512 (bytes).

In the following description, to distinguish elements of the same type from each other, a hyphenated form of reference numerals, such as in "management information 110-1" and "management information 110-2", is used. When the elements of the same type are not distinguished from each other, the un-hyphenated form of the reference numeral may be used (such as in "management information 110").

In addition, a plurality of data areas each allocated from the storage area of the storage 102 and having a size of an integer multiple of the size of the access unit are referred to as a "container area". A container area 121 includes a plurality of data areas 122. The number of data areas 122 may be any integer greater than or equal to 2, for example, 1 (M). Furthermore, it is desirable that the data areas 122 form a continuous area so that sequential access is available. In the example illustrated in FIG. 1, the container area 121-1 corresponding to the management information 110-1 has a plurality of data areas 122-1-0 to 122-1-2 each having a size of 3584 (bytes). In addition, the container area 121-2 corresponding to the management information 110-2 has a plurality of data areas 122-2-0 to 122-2-2 each having a size of 1536 (bytes). Furthermore, to identify the corresponding container area 121, the management information 110 includes a container identifier (ID) for identifying the container area 121. In the example illustrated in FIG. 1, the container ID of the container area 121-1 is "1", and the container ID of the container area 121-2 is "2".

The information that identifies the physical address of each of the data areas 122 included in the container area 121 may be the physical address itself of each of the data areas 122 or the address of the first one of the plurality of data areas and the size of the data area. In the example illustrated in FIG. 1, the management information 110 includes a container start address 112 of the container area 121 and a container management size 113 representing the size of the data area.

In addition, more specifically, information regarding the usage status of the data area 122 is one of the following three identifiers: "empty, "in use", or "not in use". The first identifier "empty" indicates the situation in which the corresponding data area 122 has not been used since it was reserved. The second identifier "in use" indicates that data is stored in the corresponding data area 122, which is currently being used. The third identifier "not in use" indicates the situation in which data has been stored in the corresponding data area 122 in the past, but data is not currently stored. In the example illustrated in FIG. 1, the information regarding the usage status of the data area 122 is referred to as "data area usage status". In the example illustrated in FIG. 1, the management information 110 includes container information 114 having the data area usage status of each of the data areas 122 and a slot number indicating the ordinal number of the data area 122 relative to the first one of the data areas 122. The slot number may begin with 0 or 1. Note that in order to identify the physical address of each of the data areas, it is desirable that the slot number begin with 0. The container information 114-1 illustrated in FIG. 1 has records 115-1-0 to 115-1-2. In addition, the container information 114-2 has records 115-2-0 to 115-2-2.

The logical address information 111 is information that associates the logical address of the above-described data with the information that identifies the physical address of the data area 122 into which the data was written in the storage area of the storage 102. The information that identifies the physical address of the data area 122 may be the physical address itself of the data area 122 or may be the container number and the slot number. The physical address of the first data area 122 of the container area 121 to which the corresponding data area 122 belongs and the container management size 113 of the corresponding container area 121 may be identified by using the container number. Subsequently, by using the slot number and the container management size 113, it is possible to identify the offset from the corresponding first data area 122 to the physical address of the data area 122 to be identified. Thereafter, by adding the identified offset to the physical address of the corresponding first data area 122, it is possible to identify the physical address of the data area 122 to be identified.

The logical address information 111 illustrated in FIG. 1 includes a logical address, a container ID, and a slot number. The logical address information 111 illustrated in FIG. 1 has records 116-0 and 116-1. The record 116-0 indicates that data having a logical address of 0 (KB) is stored in an area identified by the container ID "1" and the slot number "0". The record 116-1 indicates that data having a logical address of 0 (KB) is stored in an area identified by the container ID "1" and the slot number "1".

The storage control apparatus 101 receives a write request including write data of a predetermined size and the logical address of the write data. The predetermined size may be any size larger than or equal to the access unit of the storage 102. For example, the predetermined size is 4096 (bytes) or 8192 (bytes). In the following example, the predetermined size is set to 4096 (bytes). As used herein, a write request is referred to as a "write I/O". In addition, data to be written is referred to as "write data". Likewise, a read request is referred to as a "read I/O". The read I/O contains the logical address of the range of an area to be read. The range of an area to be read is referred to as a "read range".

In addition, the storage control apparatus 101 may accept write I/O including write data of the predetermined size or larger. In this case, the storage control apparatus 101 may divide the write data included in the write I/O into data segments of the same predetermined size and may consider that it accepts the divided predetermined write data and the logical addresses of the divided predetermined write data. The sender of the write I/O is the user of the storage control apparatus 101 (for example, a host apparatus). However, the sender is not limited thereto. For example, assume that data is migrated from a storage to which the present embodiment is not applied to the storage 102 according to the present embodiment. In this case, an apparatus that performs data migration may use the data read out of the storage to which the present embodiment is not applied as write data and may send write I/O to the storage control apparatus 101.

As indicated by process (1) in FIG. 1, the storage control apparatus 101 receives write data wd. In addition, the logical address of the start of the accepted write data is 0 (KB). In the example illustrated in FIG. 1, since the size of the write data wd is 4096 (bytes) or more, which is the predetermined size, the storage control apparatus 101 divides the write data wd into data segments of 4096 (bytes). Hereinafter, the data segment obtained by dividing the write data is referred to as "divided write data". In the example illustrated in FIG. 1, as indicated by process (2), the storage control apparatus 101 divides the write data wd and obtains divided write data wds-0, wds-1, . . . In addition, the logical address of the divided write data wds-0 is 0 (KB), and the logical address of the divided write data wds-1 is 4 (KB). In this case, since the logical addresses 0 (KB) and 4 (KB) are registered in the logical address information 111, the data overwrites old data.

Subsequently, upon receiving the divided write data wds having the predetermined size and the logical address of the divided write data wds, the storage control apparatus 101 compresses the divided write data wds. Hereinafter, the compressed data obtained by compressing the divided write data is referred to as "compressed divided write data". In the example illustrated in FIG. 1, as indicated by processes (3-1) and (3-2), the storage control apparatus 101 compresses the divided write data wds-0 and wds-1 and obtains the compressed divided write data wdsc-0 and wdsc-1, respectively. In this example, it is assumed that the sizes of the compressed divided write data wdsc-0 and wdsc-1 are 3584 (bytes) and 1536 (bytes), respectively.

subsequently, from among the pieces of the management information 110, the storage control apparatus 101 identifies the piece of the management information 110 corresponding to a size larger than or equal to the size of the compressed divided write data wdsc. By identifying the piece of the management information 110, the container area 121 that serves as the storage destination of the compressed divided write data wdsc is determined. At this time, it is desirable that the size larger than or equal to the size of the compressed divided write data wdsc be the smallest one of the sizes larger than or equal to the size of the compressed divided write data wdsc. In the example illustrated in FIG. 1, as indicated by process (4-1), since the size of the compressed divided write data wdsc-0 is 3584 (bytes), the storage control apparatus 101 selects the management information 110-1 having a container management size of 3584 (bytes). Similarly, as indicated by process (4-2) in FIG. 1, since the size of the compressed divided write data wdsc-1 is 1536 (bytes), the storage control apparatus 101 selects the management information 110-2 having a container management size of 1536 (bytes).

Note that when the compressed divided write data wdsc is obtained, there may be no piece of the management information 110 corresponding to the smallest one of the container management sizes larger than or equal to the size of the compressed divided write data wdsc. In this case, the storage control apparatus 101 may generate a piece of management information 110 corresponding to the above-described smallest size. More specifically, the storage control apparatus 101 reserves, from the storage 102, a container area 121 having a plurality of data areas 122 having the smallest size. Thereafter, the storage control apparatus 101 generates the piece of the management information 110 in the memory and sets, in the container start address 112 in the generated piece of management information 110, the start address of the plurality of data areas 122 in the reserved container area 121. In addition, the storage control apparatus 101 sets, in the container management size 113 of the generated piece of the management information 110, the above-described smallest size. For example, the storage control apparatus 101 sets the data area usage statuses of all of records 115 of the container information 114 to "empty".

In addition, even when there is the management information 110 corresponding to the smallest one of the sizes larger than or equal to the size of the compressed divided write data wdsc, the data area usage statuses of all the records 115 in the container information 114 may be "in use". In this case, the storage control apparatus 101 may generate a new pieces of management information 110 corresponding to the above-described smallest size in the same manner. As described above, there may be a plurality of pieces of management information 110 corresponding to the same size.

In addition, at maximum, n types of management information 110 are generated (for the sizes from the size the same as the size of the access unit to the predetermined size). In the example illustrated in FIG. 1, n=8, since the size of the access unit is 512 (bytes) and the predetermined size is 4096 (bytes).

Subsequently, the storage control apparatus 101 writes the compressed divided write data wdsc into an unused one of the plurality of data areas 122 identified from the identified management information 110. In addition to writing compressed divided write data wdsc, the storage control apparatus 101 stores, in the logical address information 111, the information that identifies the physical address of the unused data area in association with each other the logical address of the divided write data.

At this time, data overwriting may occur and, thus, the identified container ID may be the same as the container ID of old data before overwriting indicated by the record 116. In this case, the storage control apparatus 101 may overwrite the data area 122 indicated by the slot number of the old data with the compressed divided write data wdsc. This makes it unnecessary for the storage control apparatus 101 to update the data area usage status of the container information 114 and the logical address information 111. In the case illustrated in FIG. 1, data overwriting occurs. For the logical address 0 (KB), both the identified container ID and the container ID of the old data before overwriting indicated by the record 116-0 are 1 and therefore are the same. In this case, as indicated by process (5-1) in FIG. 1, the storage control apparatus 101 writes the compressed divided write data wdsc into the data area 122-1-0 indicated by the slot number 0 of the old data.

For the logical address 4 (KB), the identified container ID is 2, and the container ID of the old data before overwriting indicated by the record 116-1 is 1. Thus, they are different container IDs. In this case, as indicated by process (5-2) in FIG. 1, the storage control apparatus 101 writes the compressed divided write data wdsc into the unused data area 122-2-2 of the identified container having an ID=2. In addition, as indicated by process (6-2) in FIG. 1, the storage control apparatus 101 stores "2" in the container ID of the record 116-1 and further stores "2" in the slot number of the record 116-1. Furthermore, the storage control apparatus 101 updates the data area usage status in the record 115-1-1 of the container information having a container ID=1 for the old data to "not in use" and updates the data area usage status in the record 115-2-2 of the container information having a container ID=2 to "in use".

Through the above-described processing, the storage control apparatus 101 efficiently uses the storage 102. More specifically, all of the data areas 122 included in one container area 121 have the same size. Therefore, in the garbage collection process, for example, the data in a data area 122 located behind an unused data area 122 may be moved into the unused data area 122 located ahead. Thus, other data areas 122 are not influenced by the movement. As a result, the storage control apparatus 101 makes it possible to reduce the CPU load and the load on the storage 102 for garbage collection processing, as compared with in the case where the data area is variable in size.

In addition, by using the data areas 122 suitable for the size of the compressed divided write data wdsc, the storage control apparatus 101 efficiently uses the storage area of each of the data areas 122. More specifically, since the sizes of the data areas 122 are provided so as to correspond to integer multiples of the access unit of the storage 102, the size of a space having no written data in each of the data areas 122 into which the compressed divided write data wdsc is written is less than 512 (bytes) at all times. In contrast, when compressed data is written into data areas obtained by equally dividing the storage area of the storage, the size of a space having no written compressed data in a data area is smaller than the equal data size. In addition, even when a plurality of data of the same size are compressed, the sizes of the compressed data differ from one another depending on the content of the data. Therefore, to guarantee the processing in the case where the data size is negligibly reduced after compression, the equal data size is determined so as to be, for example, the data size before compression.

In the example illustrated in FIG. 1, since the data size before compression is 4096 (bytes), the size of a space having no written data in one data area is less than 4096 (bytes). That is, the storage area of the storage is less efficiently used, as compared with in the present embodiment.

Note that although only two pieces of management information 110 (the management information 110-1 and 110-2) are provided in FIG. 1, the storage control apparatus 101 may access three or more pieces of management information 110. The storage control apparatus 101 that accesses three or more pieces of management information 110 identifies, from among the three or more pieces of management information 110, a piece of the management information 110 corresponding to a size larger than or equal to the size of the compressed divided write data wdsc.

Note that the technique described in FIG. 1 may be applied to the storage 102 subjected to deduplication. In deduplication, the same data are detected in a plurality of data in the storage. Only one of the plurality of the same data is maintained, and the other data are removed. Thereafter, the number of the logical addresses for referencing the maintained data is managed so as to correspond to the physical addresses of the maintained data. An example in which the storage control apparatus 101 is applied to a storage system is described below with reference to FIG. 2.

Figure 2:
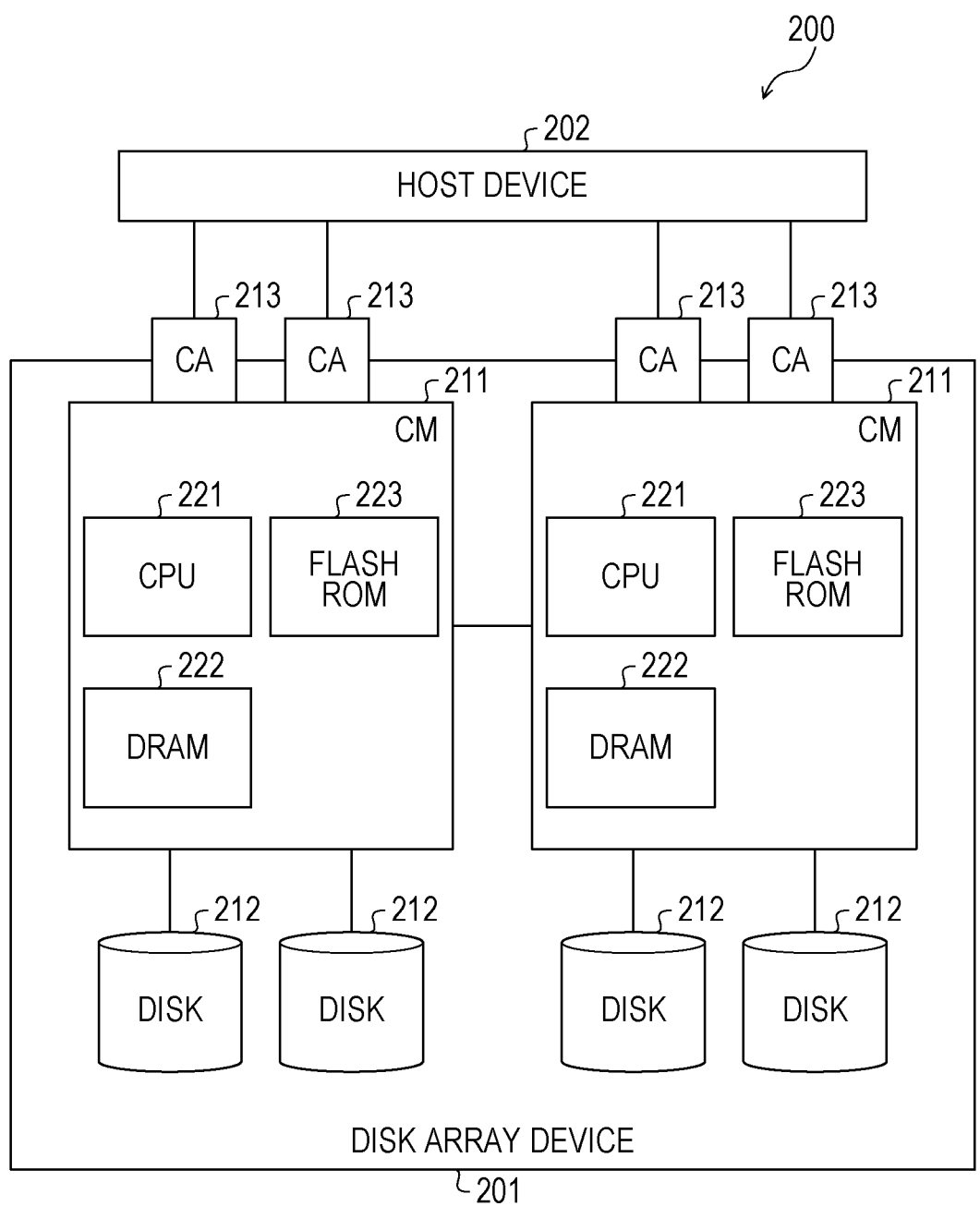
FIG. 2 illustrates an example of the hardware configuration of a storage system.

FIG. 2 illustrates an example of the hardware configuration of a storage system 200. The storage system 200 includes a disk array device 201 and a host device 202. The disk array device 201 includes at least one controller module (CM) 211, at least one disk 212, and at least one channel adapter (CA) 213. The CM 211 includes a CPU 221, a DRAM 222, and a read only memory (a flash ROM) 223. Note that the CM 211 corresponds to the storage control apparatus 101 illustrated in FIG. 1. In addition, the disk 212 corresponds to the storage 102 illustrated in FIG. 1.

The disk array device 201 is a device that provides a user with a large capacity volume in which a plurality of disks are mounted. The host device 202 is a host computer used by a user. Note that the host device 202 may be a Web server that uses the disk array device 201.

The CM 211 is a controller control unit that performs management of resources, such as the disk 212, the CA 213, the CPU 221, and the DRAM 222. The disk 212 is a nonvolatile storage device that stores user data and control information. For example, the disk 212 is a hard disk drive (HDD) or a solid state drive (SSD). All of the disks 212 may be HDDs or SSDs. Alternatively, some of the disks 212 may be HDDs, and the others may be SSDs.

The CPU 221 is an arithmetic processing unit that performs overall control of the CM 211. The CPU 221 may have a plurality of cores. The DRAM 222 is a volatile memory used as a primary cache memory in the CM 211. Accordingly, the DRAM 222 stores part of user data and control information. The flash ROM 223 is a nonvolatile memory that stores the storage control program according to the present embodiment. As a storage medium of the nonvolatile memory, a NOR flash memory or a NAND flash memory, for example, may be employed.

Example of Functional Configuration of CM

Figure 3:
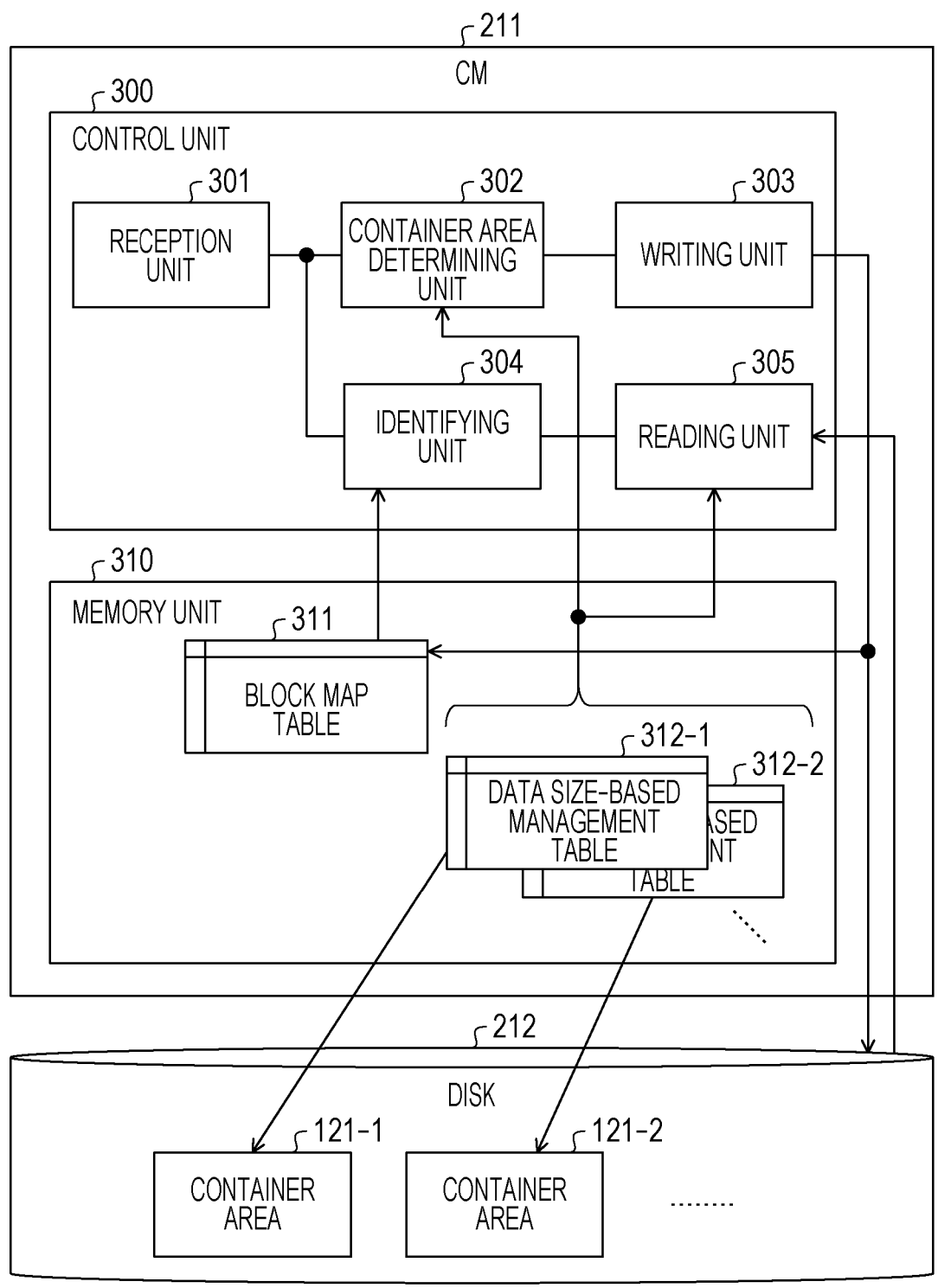
FIG. 3 illustrates an example of the functional configuration of a CM.

FIG. 3 illustrates an example of the functional configuration of the CM 211. The CM 211 includes a control unit 300. The control unit 300 includes a reception unit 301, a container area determining unit 302, a writing unit 303, an identifying unit 304, and a reading unit 305. The control unit 300 provides the functions of the above-described units when the CPU 221 executes programs stored in a storage device. More specifically, the storage device is, for example, the flash ROM 223 illustrated in FIG. 2. The result of processing performed by each of the units is stored in, for example, the DRAM 222, the register of the CPU 221, or the cache memory of the CPU 221.

Figure 5:
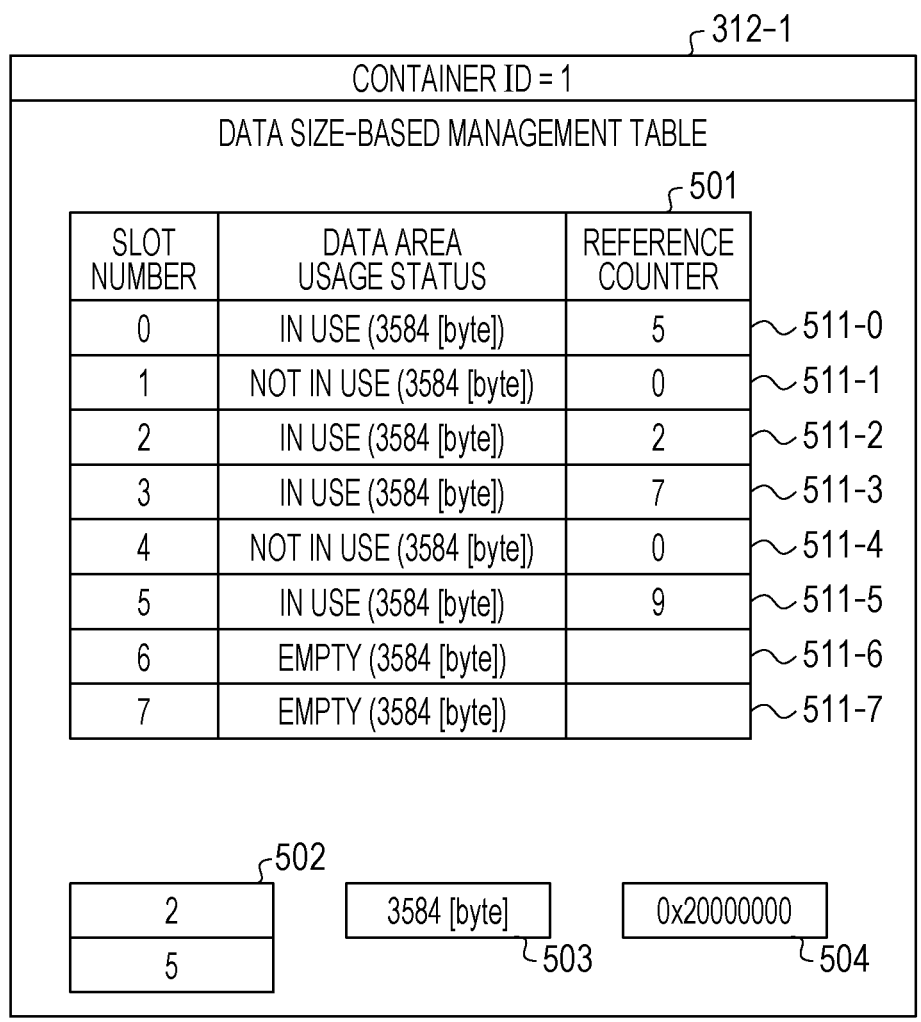
FIG. 5 illustrates an example of the details of information stored in the data size-based management table.

In addition, the CM 211 accesses the memory unit 310. An example of the memory unit 310 is the DRAM 222. The memory unit 310 has a block map table 311 and data size-based management tables 312-1, 312-2, . . . The block map table 311 corresponds to the logical address information 111 illustrated in FIG. 1. The data size-based management table 312 corresponds to the management information 110 illustrated in FIG. 1. Note that the data size-based management table 312 includes the number of logical addresses each referencing one of the data areas. The details of the information stored in the block map table 311 are illustrated in FIG. 4. In addition, the details of the information stored in the data size-based management table 312 are illustrated in FIG. 5.

Furthermore, the CM 211 accesses the disks 212. In each of the disks 212, a container area 121 corresponding to the data size-based management table 312 is provided. Note that in FIG. 3, a plurality of container areas 121 are reserved on the disk 212. However, the locations of the container areas 121 is not limited thereto. For example, one container area 121 may be provided across a plurality of disks 212. In addition, the plurality of data areas 122 included in the data size-based management table 312 have data that are not duplicates due to deduplication.

The reception unit 301 receives write I/O or read I/O.

In response to receipt of write I/O by the reception unit 301, the container area determining unit 302 divides write data wd having a size of 4096 (bytes) or more into divided write data wds having a predetermined size. Thereafter, the container area determining unit 302 identifies the data size-based management table 312 corresponding to a size larger than or equal to the size of the compressed divided write data wdsc obtained by compressing the divided write data wds. By identifying the data size-based management table 312, the container area 121 serving as the storage destination of the compressed divided write data wdsc is determined.

The writing unit 303 writes the compressed divided write data wdsc into an unused data area 122 in the container area 121 determined by the container area determining unit 302. In addition to writing the above-described compressed divided write data wdsc, the writing unit 303 stores, in the block map table 311, the container ID in association with the slot number of the data area 122. In addition, if there are a plurality of unused data areas 122 in the container area 121 determined by the container area determining unit 302, the writing unit 303 may write the compressed divided write data wdsc in the first one of the unused data areas 122.

In addition, as described above with reference to FIG. 1, when the identified container ID and the container ID of the old data before overwriting are the same, the data area 122 indicated by the slot number of the old data may be overwritten by the compressed divided write data wdsc. When this technique is applied to deduplication, the writing unit 303 further determines whether the number of the logical addresses that references the data areas 122 indicated by the slot number corresponding to the logical address of the divided write data wds in the block map table 311 is one. When the number of the logical addresses is one, the data area 122 indicated by the slot number of the old data is not referenced by a plurality of logical addresses. As a result, overwriting is possible. Therefore, when the number of logical addresses that references the corresponding data area 122 is one, the writing unit 303 overwrites the data area 122 indicated by the slot number of the old data with the compressed divided write data wdsc.

In response to receipt of read I/O, when the logical address of the read range is larger than or equal to 4096 (bytes), the identifying unit 304 divides the read range and obtains divided read ranges each having a predetermined size. Thereafter, the identifying unit 304 references the block map table 311 and identifies the container ID and the slot number corresponding to the logical address of the divided read range.

The reading unit 305 calculates the physical address of the data area 122 having the data corresponding to the logical address of the divided read range written therein and reads the data at the calculated physical address in the disk 212. More specifically, the reading unit 305 calculates the aforementioned physical address based on the physical address of the start of the plurality of data areas 122 in the container indicated by the identified container ID, the identified slot number, and the container management size for the identified container ID. For example, the reading unit 305 calculates the aforementioned physical address by using the following Equation (1):

physical address of data area 122 corresponding to divided read range=container start address for identified container ID+(container managed size for identified container ID×identified slot number) (1).

Note that in Equation (1), the slot number begins with 0. When the slot number begins with 1, the reading unit 305 calculates the physical address by subtracting 1 from the slot number in Equation (1).

FIG. 4 illustrates an example of the details of the information stored in the block map table 311. The block map table 311 illustrated in FIG. 4 has records 401-0 to 401-12.

The block map table 311 has the following three fields: a logical address, a physical storage container ID, and a physical storage slot number. The logical address field stores a value indicating a logical address. The physical storage container ID field stores the ID of the container having the data identified by the corresponding logical address stored therein. The physical storage slot number field stores the slot number of the slot having the data identified by the corresponding logical address stored therein.

For example, the record 401-0 indicates that the data identified by the logical address 0 (KB) is stored in the data area 122 managed (identified) by container ID 2 and slot number 0.

As an example of the data size-based management table 312, an example of the details of the information stored in the data size-based management table 312-1 is described below with reference to FIG. 5.

FIG. 5 illustrates an example of the details of the information stored in the data size-based management table 312-1. The data size-based management table 312 has a container ID, container information 501, a not-in-use queue 502, a container management size 503, and a container start address 504.

The container ID is the ID of the container managed by the CM 211. The container information 501 has information about a container managed by the CM 211. The container information 501 illustrated in FIG. 5 has records 511-0 to 511-7.

More specifically, the container information 501 includes the following three fields: a slot number, a data area usage status, and a reference counter. In the slot number field, the slot number of a slot in the corresponding container is stored. In the data area usage status field, an identifier indicating the usage status of the data area 122 managed by the slot number is stored. Examples of the identifiers indicating the usage status are "empty", "in use", and "not in use", as illustrated in FIG. 1.

In the reference counter field, the reference counter of the corresponding data area 122 is stored. More specifically, the reference counter represents the number of logical addresses that reference the corresponding data area 122.

The not-in-use queue 502 is a queue for managing data areas 122 each having a usage status of "not in use" in the corresponding container. The container management size 503 is the size of the data area 122 in the corresponding container area 121. The container start address 504 is the physical address of the first one of the data areas 122 in the corresponding container area 121.

An example of the operation performed by the CM 211 at the time of receipt of write I/O is described with reference to FIGS. 6 to 8.

Figure 6:
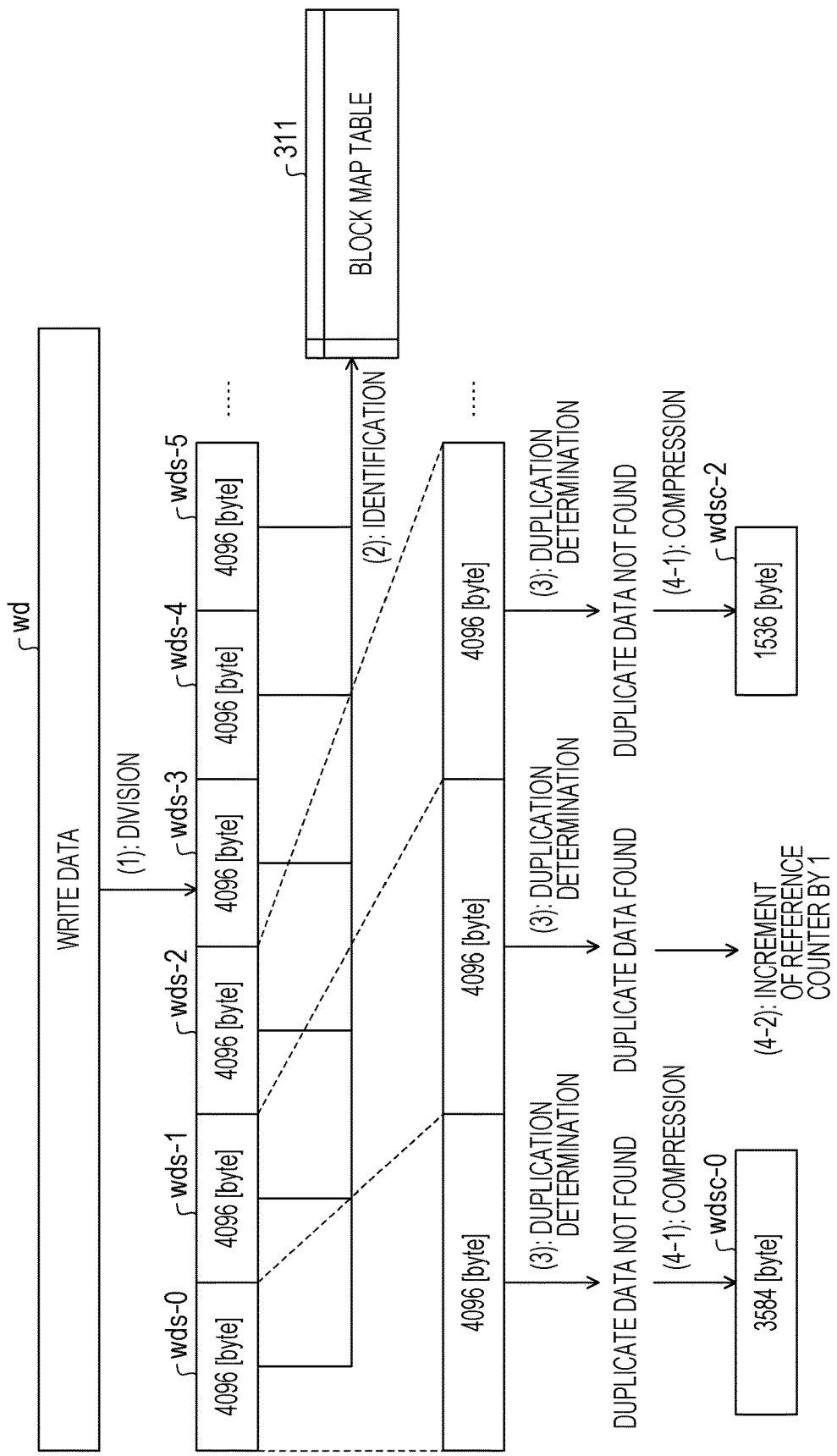
FIG. 6 illustrates an example of the operation (part 1) performed at the time of receipt of write I/O.

FIG. 6 illustrates an example of the operation (part 1) performed at the time of receipt of write I/O. As indicated by process (1) in FIG. 6, the CM 211 divides the write data wd included in the write request received from the host device 202 into 4096-byte data segments. Subsequently, processing is performed for each of the divided write data wds obtained by dividing the write data wd. In the example illustrated in FIG. 6, the CM 211 divides the write data wd and obtains divided write data wds-0 to wds-5.

Subsequently, as indicated by process (2) in FIG. 6, the CM 211 references the block map table 311 and identifies the storage position of the old data for each of the divided write data wds. An example of the operation for identifying the storage position of the old data is described in more detail below. For example, suppose that the write request is a request to write the write data wd at the start logical address 0 (KB). In this case, the logical address of the divided write data wds-0 is 0 (KB). Thus, for the divided write data wds-0, the CM 211 references the record 401-0 illustrated in FIG. 4 and identifies that the old data of the divided write data wds-0 is located in the data area indicated by container ID 2 and slot number 0. In addition, the logical address of the divided write data wds-1 is 4 (KB). Thus, for the divided write data wds-1, the CM 211 references the record 401-1 illustrated in FIG. 4 and identifies that the old data of the divided write data wds-1 is located in the data area indicated by container ID 6 and slot number 0.

Thereafter, as indicated in process (3) in FIG. 6, the CM 211 determines whether among the compressed data stored in the disk 212, the one that duplicates one of the divided write data wds is present. More specifically, the CM 211 calculates the hash value of the original data of the compressed data. Upon storing the compressed data in the disks 212, the CM 211 stores, in the DRAM 222 or the like, the calculated hash value in association with the physical storage container ID and the physical storage slot number. Thereafter, the CM 211 calculates the hash value of each of the division write data wds and compares the calculated hash value with each of the stored hash values to determine whether duplicate data is present. More specifically, when the hash value of each of the divided write data wds is the same as any one of the stored hash values, the CM 211 determines that there is duplicate data. However, when the hash value of each of the divided write data wds differs from all of the stored hash values, the CM 211 determines that there is no duplicate data. In the example illustrated in FIG. 6, the CM 211 determines that there is no duplicate data for each of the divided write data wds-0 and wds-2 and determines that there is duplicate data for the divided write data wds-1.

When it is determined that there is no duplicate data for each of the divided write data wds, the CM 211 compresses the divided write data wds as indicated by process (4-1) in FIG. 6 and obtains compressed divided write data wdsc. In the example illustrated in FIG. 6, the CM 211 compresses the divided write data wds-0 and wds-2 and obtains compressed divided write data wdsc-0 and wdsc-2, respectively. In this example, the size of the compressed divided write data wdsc-0 illustrated in FIG. 6 is 3584 (bytes), and the size of the compressed divided write data wdsc-2 is 1536 (bytes).

However, when it is determined that there is duplicate data for one of the divided write data wds, the reference counter for the duplicate data is incremented by one, as indicated by process (4-2) in FIG. 6. An increment/decrement process of the reference counter is described below with reference to FIG. 9.

Figure 7:
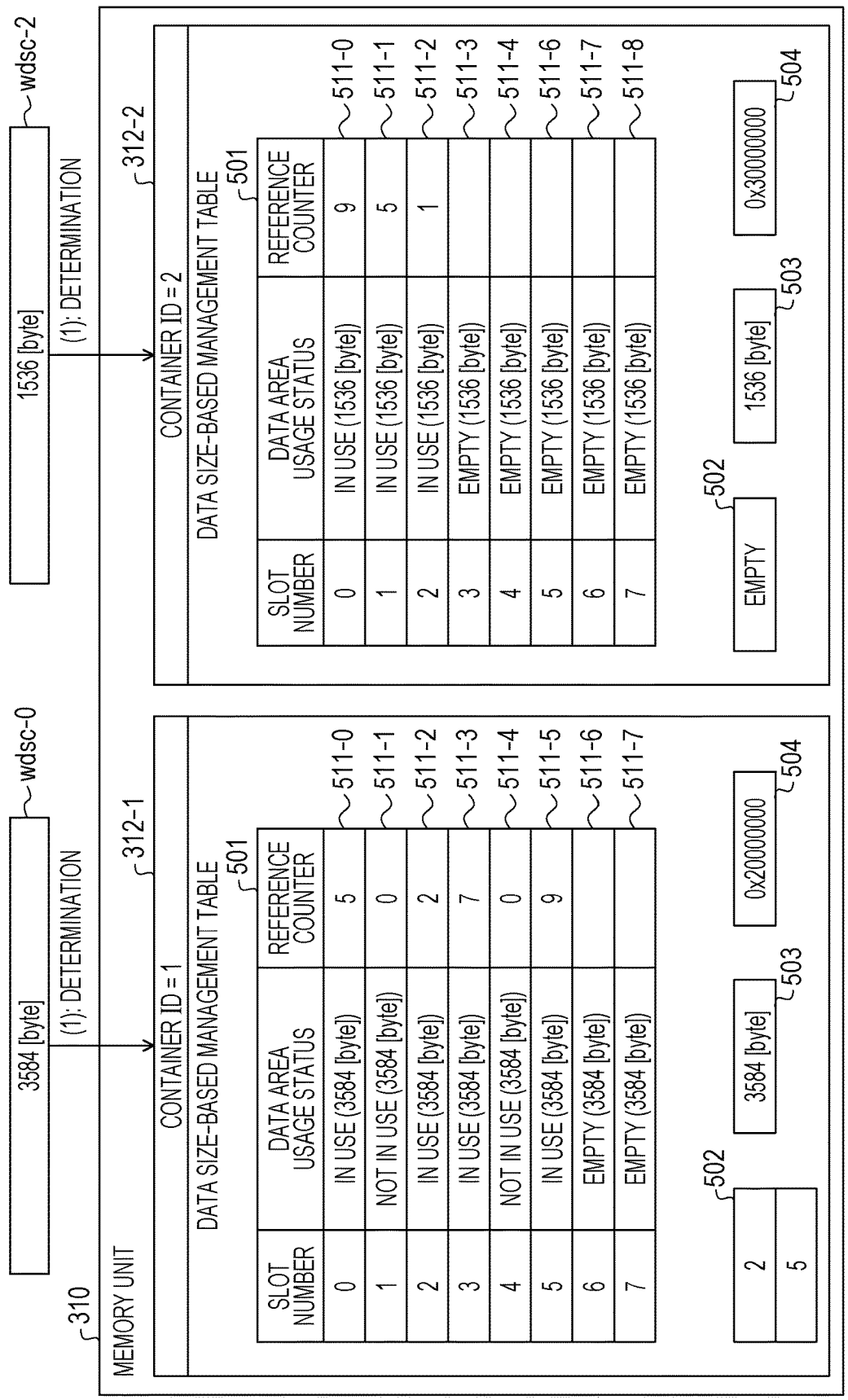
FIG. 7 illustrates an example of the operation (part 2) performed at the time of receipt of write I/O.

FIG. 7 illustrates an example of the operation (part 2) performed at the time of receipt of write I/O. In FIG. 7, the process (4-1) illustrated in FIG. 6 has already been completed. As indicated by process (1) in FIG. 7, the CM 211 determines the disk write size in accordance with the data size of the compressed divided write data wdsc and determines a container corresponding to the determined disk write size as the storage destination of the data. More specifically, the CM 211 determines, as the disk write size, the size obtained by rounding up the compressed data size to the nearest integer multiple of the access unit (512 bytes). In this example, since the size of the uncompressed data is 4096 (bytes), the disk write size is 512×n (bytes), where n is any one of integers 1 to 8.

In the example illustrated in FIG. 7, the CM 211 determines, as the storage destination of the divided write data wds-0, a container having a container ID of 1 whose container management size is 3584 (bytes). Similarly, the CM 211 determines, as the storage destination of the divided write data wds-2, the container having a container ID of 2 whose container management size is 1536 (bytes).

Figure 8:
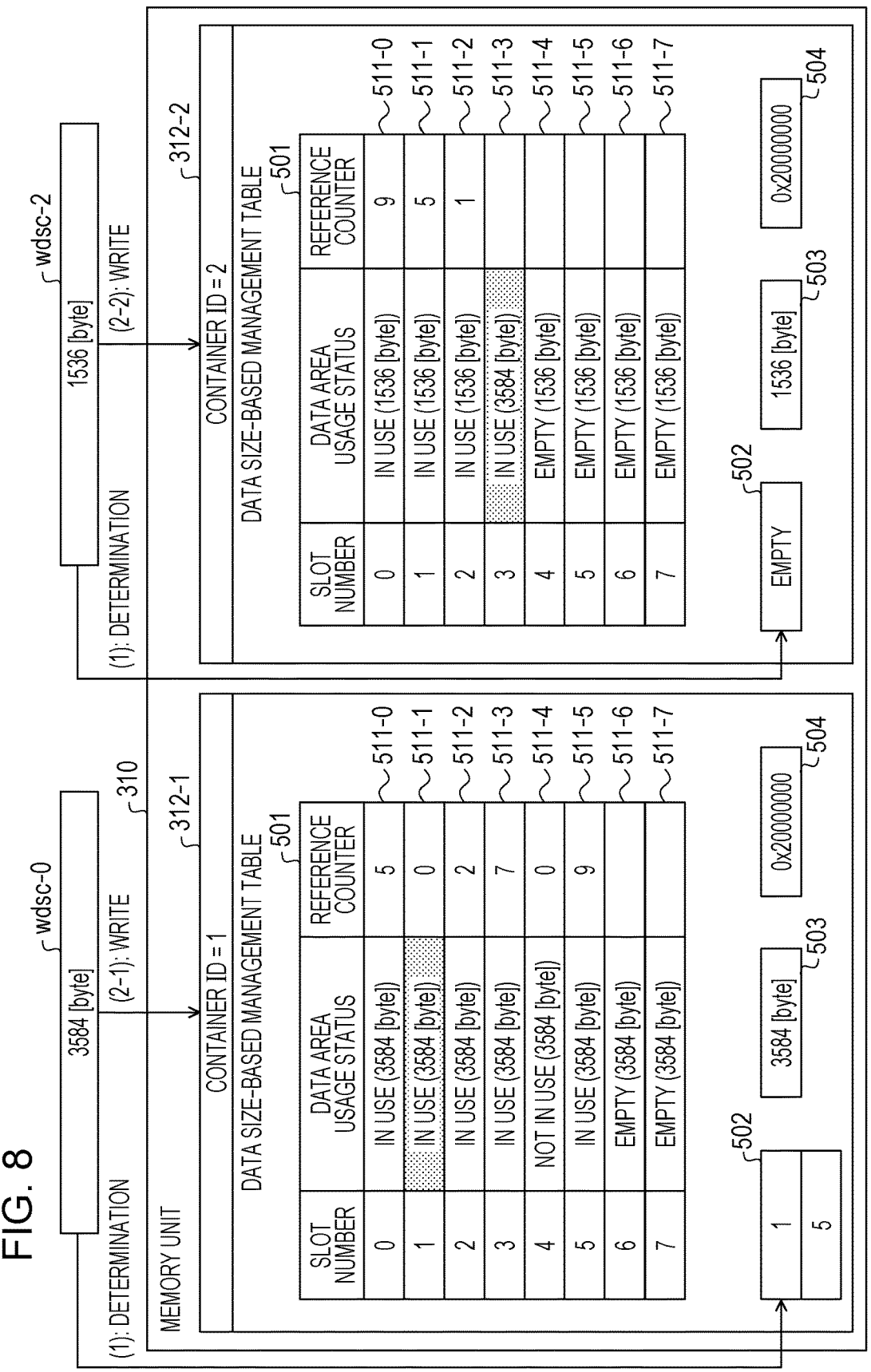
FIG. 8 illustrates an example of the operation (part 3) performed at the time of receipt of write I/O.

FIG. 8 illustrates an example of the operation (part 3) performed at the time of receipt of write I/O. In FIG. 8, the process (1) illustrated in FIG. 7 has already been completed. As indicated by process (1) in FIG. 8, the CM 211 determines whether there is a data area 122 connected to the not-in-use queue 502 for the container determined as the storage destination. In the example illustrated in FIG. 8, the CM 211 references the not-in-use queue 502 for the container ID=1 determined as the storage destination of the divided write data wds-0 and determines that there is a data area 122 connected to the not-in-use queue 502. In addition, the CM 211 references the not-in-use queue 502 for the container ID=2 determined as the storage destination of the divided write data wds-2 and determines that there is no data area 122 connected to the not-in-use queue 502.

Subsequently, when the CM 211 determines that there is a data area 122 connected to the not-in-use queue 502, the CM 211 writes the compressed divided write data wdsc into the data area 122 which is an element at the top of the not-in-use queue 502 for the container determined as the storage destination, as indicated by process (2-1) in FIG. 8. In the example illustrated in FIG. 8, the CM 211 writes the compressed divided write data wdsc-0 into the data area 122 managed (indicated) by the slot number 1, which is the element at the top of the not-in-use queue 502 in the data size-based management table 312-1.

However, when the CM 211 determines that there is no data area 122 connected to the not-in-use queue 502, the CM 211 acquires an empty data area 122 in the container determined as the storage destination, as indicated by process (2-2) in FIG. 8, and writes the compressed divided write data wdsc into the acquired empty data area 122. In the example illustrated in FIG. 8, the CM 211 writes the compressed divided write data wdsc-2 into the data area 122 managed (identified) by the slot number 3 having a usage status of "empty" in the container information 501 of the data size-based management table 312-2. Note that in FIG. 8, the areas into which the compressed divided write data wdsc-0 and wdsc-2 are written are hatched.

Figure 9:
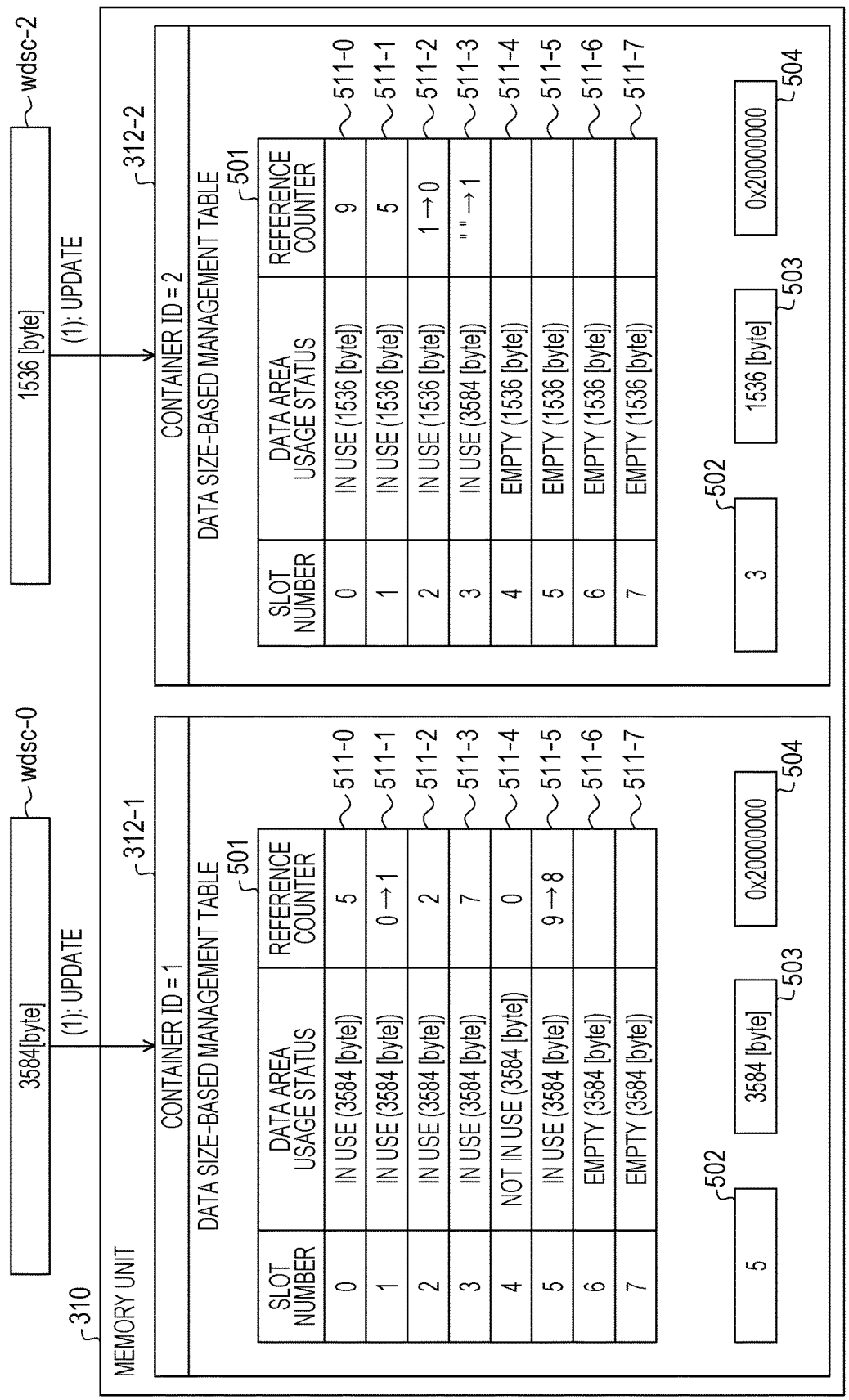
FIG. 9 illustrates an example of the operation performed in a reference counter increment/decrement process.

FIG. 9 illustrates an example of the operation performed in the reference counter increment/decrement process. In FIG. 9, processes (2-1) and (2-2) illustrated in FIG. 8 have already been completed. As indicated by process (1) in FIG. 9, the CM 211 increments the reference counter for the data area 122 into which the current compressed divided write data wdsc has been written. In addition, the CM 211 decrements the reference counter for the data area 122 used before writing the current compressed divided write data wdsc.

In the example illustrated in FIG. 9, the data area 122 used before writing the compressed divided write data wdsc-0 is the data area 122 managed (indicated) by the slot number 5 in the data size-based management table 312-1. In addition, the data area 122 used before writing the compressed divided write data wdsc-2 is the data area 122 managed (indicated) by the slot number 2 of the data size-based management table 312-2. Accordingly, the CM 211 increments the reference counter in the record 511-1 of the data size-based management table 312-1 and the reference counter in the record counter 511-3 of the data size-based management table 312-2 by one. Furthermore, the CM 211 decrements the reference counter in the record 511-5 of the data size-based management table 312-1 and the reference counter in the record 511-2 of the data size-based management table 312-2 by one.

Figure 10:
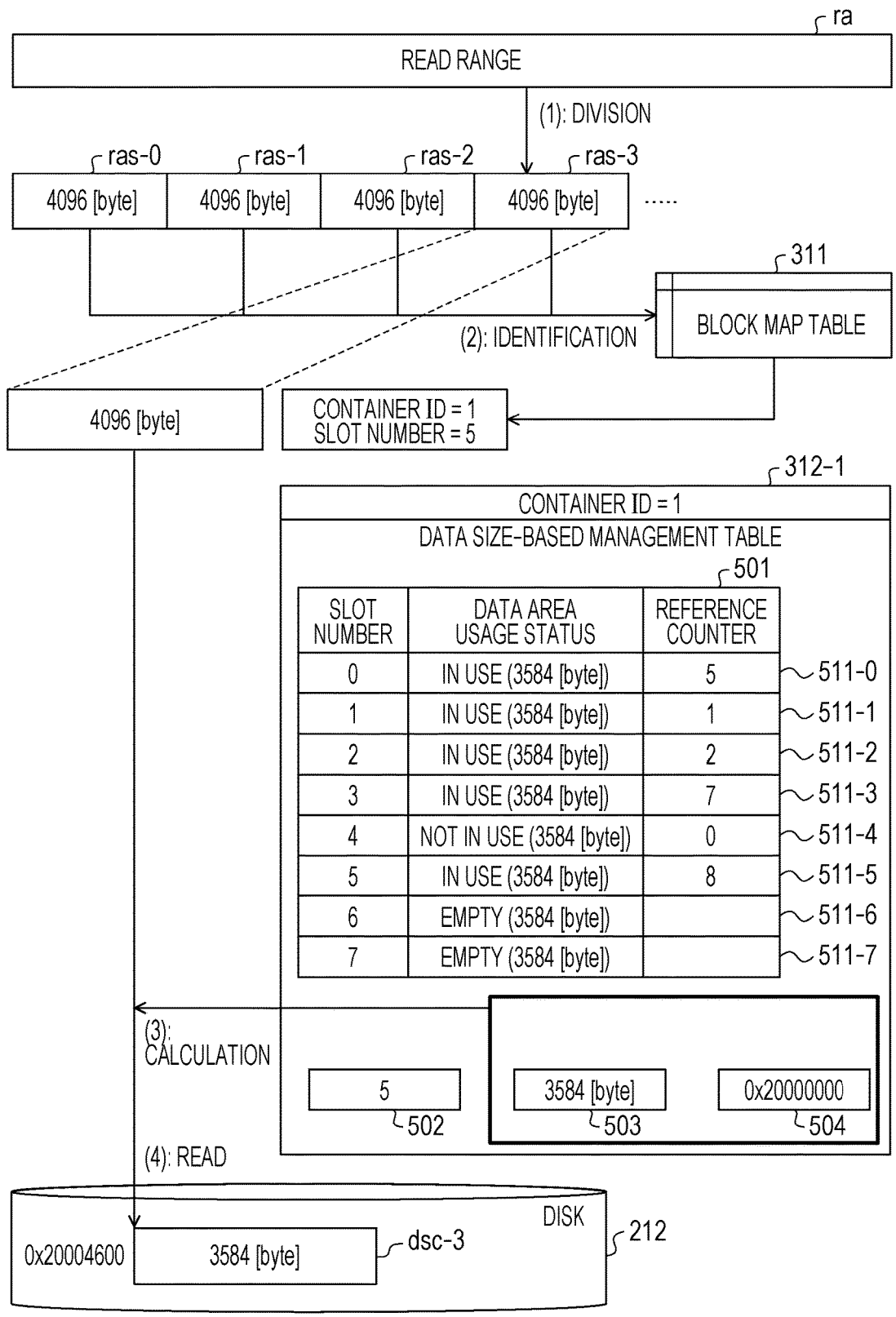
FIG. 10 illustrates an example of the operation performed at the time of receipt of read I/O.

FIG. 10 illustrates an example of the operation performed at the time of receipt of read I/O. In FIG. 10, a Read request has been received from the host device 202 after completion of process (1) illustrated in FIG. 9. As indicated by process (1) in FIG. 10, the CM 211 divides a Read range ra included in the Read request received from the host device 202 into 4096-byte ranges. The subsequent processing is performed for each of the divided read ranges ras obtained by dividing the read range ra. In the example illustrated in FIG. 10, the CM 211 divides the Read range ra and obtains divided read ranges ras-0 to ras-3 and subsequent divided read ranges. Note that in FIG. 10, description is given with reference to the divided read range ras-3.

Subsequently, as indicated by process (2) in FIG. 10, the CM 211 references the block map table 311 and identifies the container ID and the slot number of the data area 122 in which the compressed divided data of each of the divided read ranges ras is stored. In the example illustrated in FIG. 10, the CM 211 references the record 401-3 illustrated in FIG. 4 and identifies that the container ID of the data area 122 in which the data of the divided read range ras-3 is stored is 1 and the slot number is 5.

Thereafter, as indicated by process (3) in FIG. 10, the CM 211 references the data size-based management table 312 corresponding to the identified container ID and calculates the physical address of the data area 122 having the compressed divided data of each of the divided read ranges ras stored therein. More specifically, the CM 211 calculates the physical address of the data area 122 corresponding to each of the divided read range ras by using Equation (1) described with reference to FIG. 3.

In the example illustrated in FIG. 10, the CM 211 calculates the physical address of the data area 122 corresponding to the divided read range ras-3 by using Equation (1) as follows:

physical address of data area 122 corresponding to
divided read range ras-3=0x20000000+(3584×5)
=0x20004600.

Subsequently, as indicated by process (4) in FIG. 10, the CM 211 reads the compressed divided data at the calculated physical address on the disk 212. In the example illustrated in FIG. 10, the CM 211 reads the compressed divided data dsc-3 at the physical address 0x20004600. Thereafter, the CM 211 decompresses the read compressed divided data dsc-3 and transmits the decompressed data to the host device 202.

The flowchart illustrating the processing performed by the CM 211 is described below with reference to FIGS. 11A, 11B, 12, and 13.

Figure 11A:
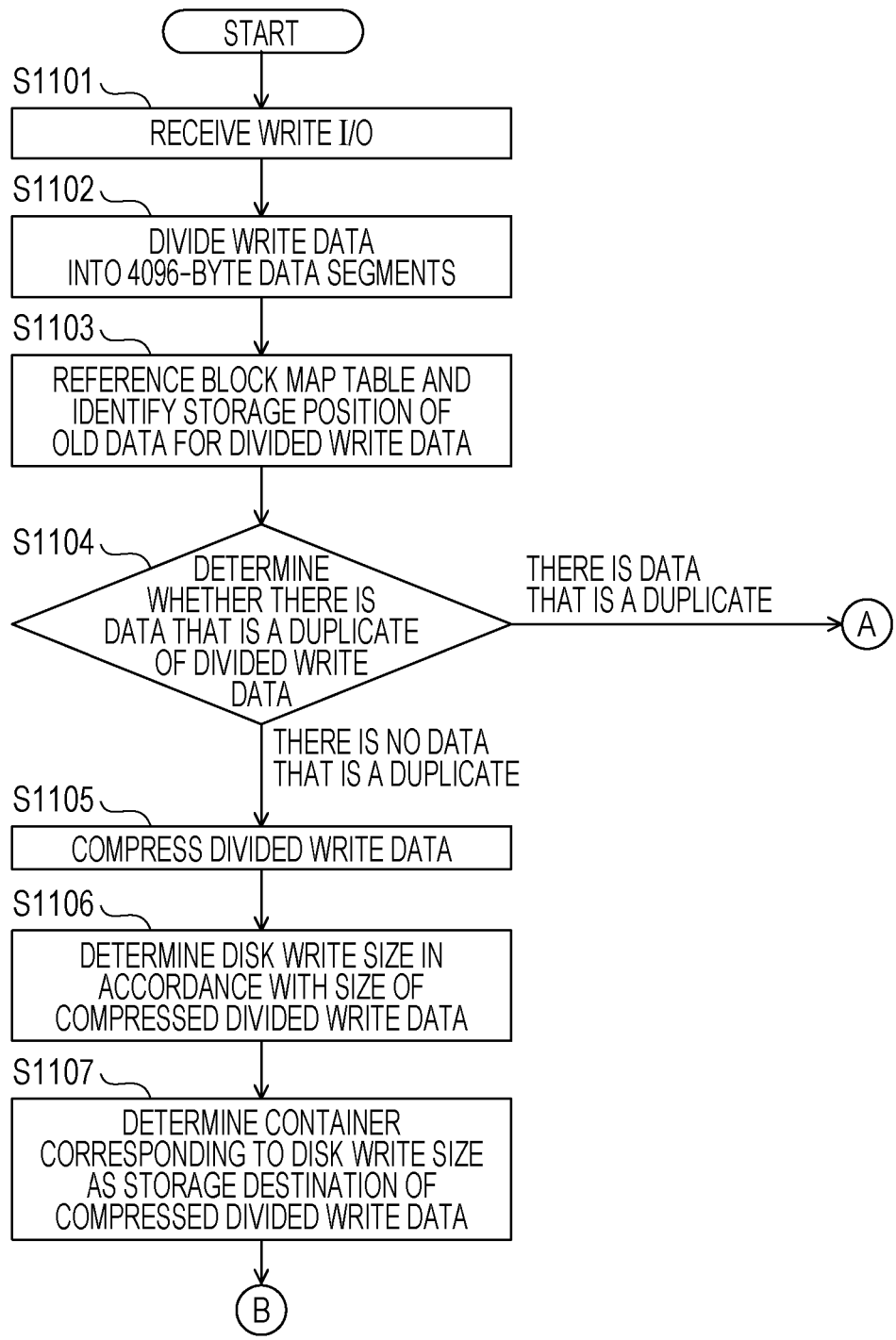
FIGS. 11A and 11B illustrate a flowchart illustrating an example of the procedure for a write I/O reception process.
Figure 11B:
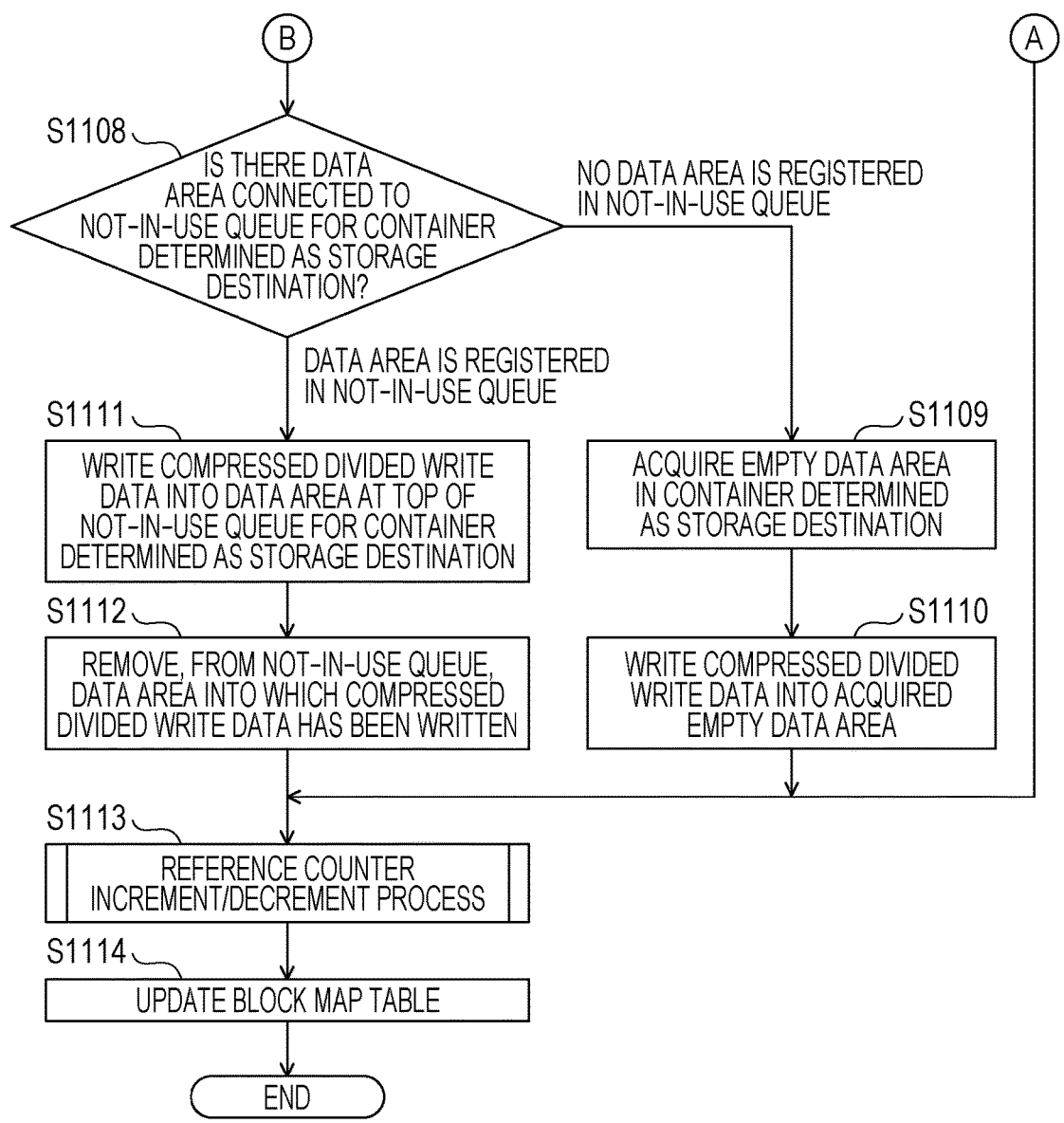

FIGS. 11A and 11B illustrate a flowchart illustrating an example of the procedure for the write I/O reception process. The CM 211 receives write I/O from the host device 202 (step S1101). Subsequently, the CM 211 divides the write data wd into 4096-byte data segments (step S1102). When the size of the Write data wd is 4096 (bytes) or more, the CM 211 performs the processes in steps S1103 to S1105 for each of the divided write data wds obtained by dividing the write data wd. Note that only one of the plurality of divided write data wds is described with reference to FIGS. 11A, 11B, and 12.

The CM 211 references the block map table 311 and identifies the storage position of the old data for the divided write data wds (step S1103). Subsequently, the CM 211 determines whether there is data that is a duplicate of the divided write data wds (step S1104).

When there is no data that is a duplicate of the divided write data wds (step S1104: duplicate data not found), the CM 211 compresses the divided write data wds (step S1105). Subsequently, the CM 211 determines the disk write size in accordance with the size of the compressed divided write data wdsc obtained by compressing the divided write data wds (step S1106). Thereafter, the CM 211 determines a container corresponding to the disk write size as the storage destination of the compressed divided write data wdsc (step S1107). Subsequently, the CM 211 determines whether there is a data area 122 connected to the not-in-use queue for the container determined as a storage destination (step S1108).

When there is no data area 122 connected to the not-in-use queue of the container determined as the storage destination (step S1108: no data area is registered in the not-in-use queue), the CM 211 acquires an empty data area of the container determined as the storage destination 122 (step S1109). Thereafter, the CM 211 writes the compressed divided write data wdsc into the acquired empty data area 122 (step S1110).

However, when there is a data area 122 connected to the not-in-use queue of the container determined as the storage destination (step S1108: data area is registered in the not-in-use queue), the CM 211 writes the compressed divided write data wdsc into the data area 122 at the top of the not-in-use queue for the container determined as the storage destination (step S1111). Thereafter, the CM 211 removes, from the not-in-use queue, the data area 122 into which the compressed divided write data wdsc has been written (step S1112).

After completion of the process in step S1110 or step S1112 or when there is data that is a duplicate of the divided write data wds (step S1104: there is duplicate data), the CM 211 performs the reference counter increment/decrement process (step S1113). The reference counter increment/decrement process is described below with reference to FIG. 12.

Subsequently, the CM 211 updates the block map table 311 (step S1114). The process in step S1114 is described in more detail below. In the process, the items to be updated are the physical storage container ID and the physical storage slot number of the record corresponding to the logical address of the divided write data wds in the block map table 311. Hereinafter, the corresponding physical storage container ID and physical storage slot number are referred to as "corresponding physical storage container ID and physical storage slot number to be updated".

For example, when in the process of step S1104, the CM 211 determines that there is duplicate data, the CM 211 updates the physical storage container ID and the physical storage slot number to be updated to the physical storage container ID and the physical storage slot number of the data area in which a duplicate of the data is stored.

In addition, when in the process in step S1108, the CM 211 determines that the data area 122 is not registered in the not-in-use queue, the CM 211 updates the physical storage container ID and the physical storage slot number to be updated to the physical storage container ID and the physical storage slot number of the acquired data area 122, respectively. However, when in the process in step S1108, the CM 211 determines that the data area 122 is registered in the not-in-use queue, the CM 211 updates the physical storage container ID and the physical storage slot number to be updated to the physical storage container ID and the physical storage slot number of the data area 122 into which the compressed divided write data has been written, respectively.

After completion of the process in step S1114, the CM 211 ends the write I/O reception process.

Figure 12:
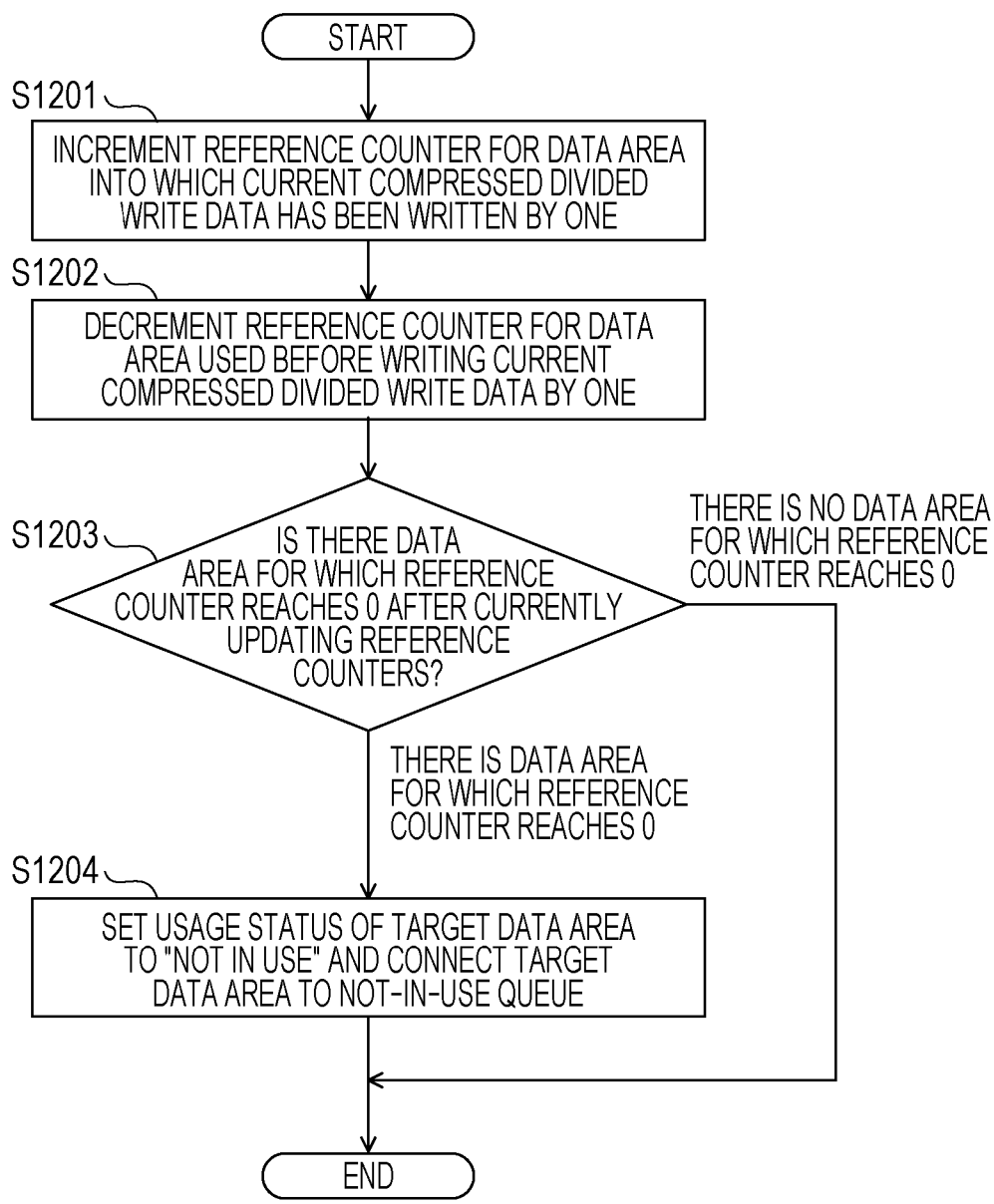
FIG. 12 is a flowchart illustrating an example of the procedure for the reference counter increment/decrement process.

FIG. 12 is a flowchart illustrating an example of the procedure for the reference counter increment/decrement process. The CM 211 increments the reference counter for the data area 122 into which the current compressed divided write data wdsc has been written by one (step S1201). In addition, the CM 211 decrements the reference counter for the data area 122 used before writing the current compressed divided write data by one (step S1202). Thereafter, the CM 211 determines whether there is a data area 122 for which the reference counter reaches 0 after updating the current reference counters (step S1203).

When there is a data area 122 for which the reference counter reaches 0 (step S1203: there is a data area for which the reference counter reaches 0), the CM 211 sets the status of the data area 122 to "not in use" and connects the data area 122 to the not-in-use queue (step S1204). After completion of the process in step S1204 or when there is no data area 122 for which the reference counter reaches 0 (step S1203: there is no data area for which the reference counter reaches 0), the CM 211 ends the reference counter increment/decrement process.

Figure 13:
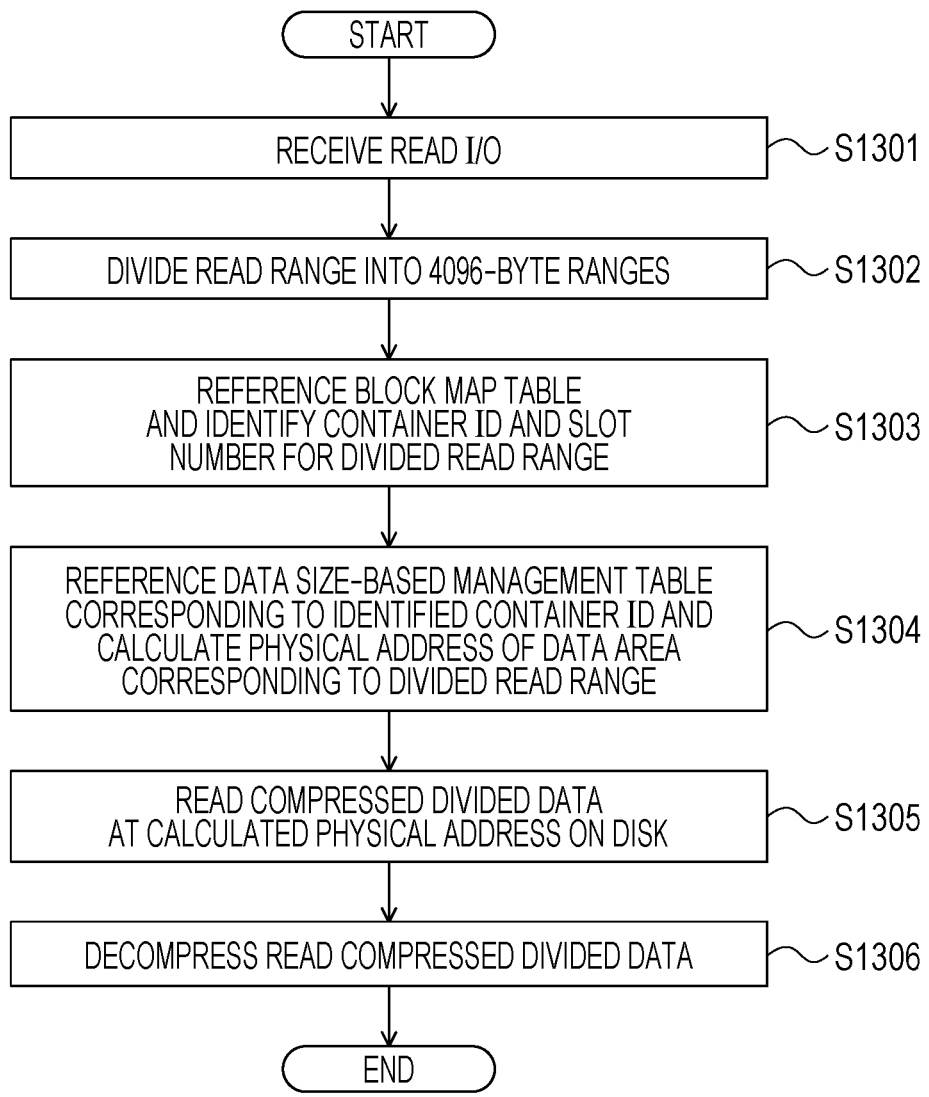
FIG. 13 is a flowchart illustrating an example of the procedure for a read I/O reception process.

FIG. 13 is a flowchart illustrating an example of the procedure for the read I/O reception process. The CM 211 receives read I/O (step S1301). Subsequently, the CM 211 divides the Read range ra into 4096-byte ranges (step S1302). When the Read range ra is larger than or equal to 4096 (bytes), the CM 211 performs the processes in steps S1303 to S1306 for each of the divided read ranges ras obtained by dividing the read range ra. Note that only one of the plurality of divided read data range ras is described with reference to FIGS. 11A, 11B, and 12.

The CM 211 references the block map table 311 and identifies the container ID and the slot number for the divided read range ras (step S1303). Subsequently, the CM 211 references the data size-based management table 312 corresponding to the identified container ID and calculates the physical address of the data area 122 corresponding to the divided read range ras (step S1304). Thereafter, the CM 211 reads the compressed divided data at the calculated address on the disk 212 (step S1305). Subsequently, the CM 211 decompresses the read compressed divided data (step S1306). After completion of the process in step S1306, the CM 211 concatenates the divided data obtained by decompressing each of the compressed divided data and transmits, to the host device 202, the concatenated data as Read data. Thus, the CM 211 ends the read I/O reception process.

As described above, the CM 211 according to the first embodiment identifies the data area 122 having a size larger than or equal to the size of the compressed divided write data wdsc by using the data size-based management table 312 and writes the compressed divided write data wdsc into the data area 122. In this manner, the CM 211 efficiently uses the disk 212. More specifically, as described with reference to FIG. 1, the CM 211 reduces the load on the CPU 221 and the load on the disk 212, as compared with in the case where the data area 122 has a variable length. Furthermore, the CM 211 efficiently uses the storage area of the disk 212.

In the case of the disk 212 being an HDD, when there are a plurality of unused data areas 122 in the container area 121 determined by the container area determination unit 302, the CM 211 may write the compressed divided write data wdsc into the first one of the unused data areas 122. As a result, the garbage collection process performed by the CM 211 is unnecessary and, thus, the write I/O and the read I/O are continued so that the data are written, in order from front to back, at all times. Note that when the storage area of the disk 212 is accessed by using a head, the above-described effect is provided at all times. For example, the disk 212 may be an optical disk. When the disk 212 is an HDD, the head is a magnetic head. When the disk 212 is an optical disk, the head is an optical head.

In addition, the CM 211 may calculate the physical address of the data area corresponding to a divided read range ras by using Equation (1). Thus, since the physical address for reading is easily identified, the reading speed of the CM 211 increases. More specifically, when compressed data are written, in order from front to back, into the storage area of the storage without dividing the storage area, a table including a correspondence between the identifier of a data area having the compressed data stored therein and the physical address of the data area is prepared, since the size of the compressed data is variable. However, according to the present embodiment, the physical address from which data is read is obtained by multiplying the container management size by the slot number. This makes it unnecessary for the CM 211 to reference the above-mentioned table. As a result, the reading speed of the CM 211 increases.

In the case where deduplication is not employed, the CM 211 may overwrite old data in the data area 122 indicated by the slot number of the old data with the compressed divided write data wdsc when the identified container ID and the container ID of the old data are the same. This makes it unnecessary for the CM 211 to update the block map table 311 and the data size-based management table 312, so that the load on the CM 211 decreases.

In the case where deduplication is employed, in addition to the conditions for no deduplication, the CM 211 determines whether the reference counter for the slot number corresponding to the logical address of the divided write data wds in the block map table 311 is 1. When the reference counter is 1, the CM 211 may overwrite old data in the data area 122 indicated by the slot number of the old data with the compressed divided write data wdsc. This makes it unnecessary for the CM 211 to update the block map table 311 and the data size-based management table 312, so that it is possible to reduce the load on the CM 211 even when deduplication is employed.

Second Embodiment

A storage control apparatus 101 (a CM 211) according to a second embodiment is described below. Note that the same reference numerals are given to the same elements as those described in the first embodiment, and illustration and description of the same elements are not repeated.

The tendency of the data size after compression may vary with a change in characteristics (I/O pattern) of data written by the host device 202, that is, a change in the data pattern trend. According to the first embodiment, under such circumstances, the physical storage area of the disk 212 may be unnecessarily reserved due to the use of a container (the container area 121).

Figure 14:
FIG. 14 illustrates the state of a container when the data pattern trend changes.

FIG. 14 illustrates the state of a container when the data pattern trend changes. In FIG. 14, in the initial state, the data pattern trend is an I/O pattern so that write data is compressed into data of a 6-block size. In this case, the usage status of each of the slots (the data area 122) in a 6-block container is illustrated by state (14-1) in FIG. 14.

Thereafter, suppose that the data pattern trend changes to an I/O pattern so that the write data is compressed into data of 7-block size. In this case, the usage status of each of the slots in the 6-block container and the usage status of each of the slots in the 7-block container are those illustrated in state (14-2) in FIG. 14.

In the state of the 6-block container as illustrated in state (14-2), although most of the slots are not in use, the physical capacity is consumed. As a result, the physical capacity is consumed by both the 6-block container and 7-block container. Consequently, even when deduplication and data compression are performed, the effect of efficient use of the disk 212 may be reduced.

Therefore, according to the second embodiment, the storage control apparatus 101 (the CM 211) that increases the use efficiency of the disk 212 is described. To improve the use efficiency, the storage control apparatus 101 determines the necessity of garbage collection on a container basis and enables the unused area in the container to be physically released. An example of the functional configuration of the storage control apparatus 101 (the CM 211) according to the second embodiment is described first.

Example of Functional Configuration of CM

Figure 15:
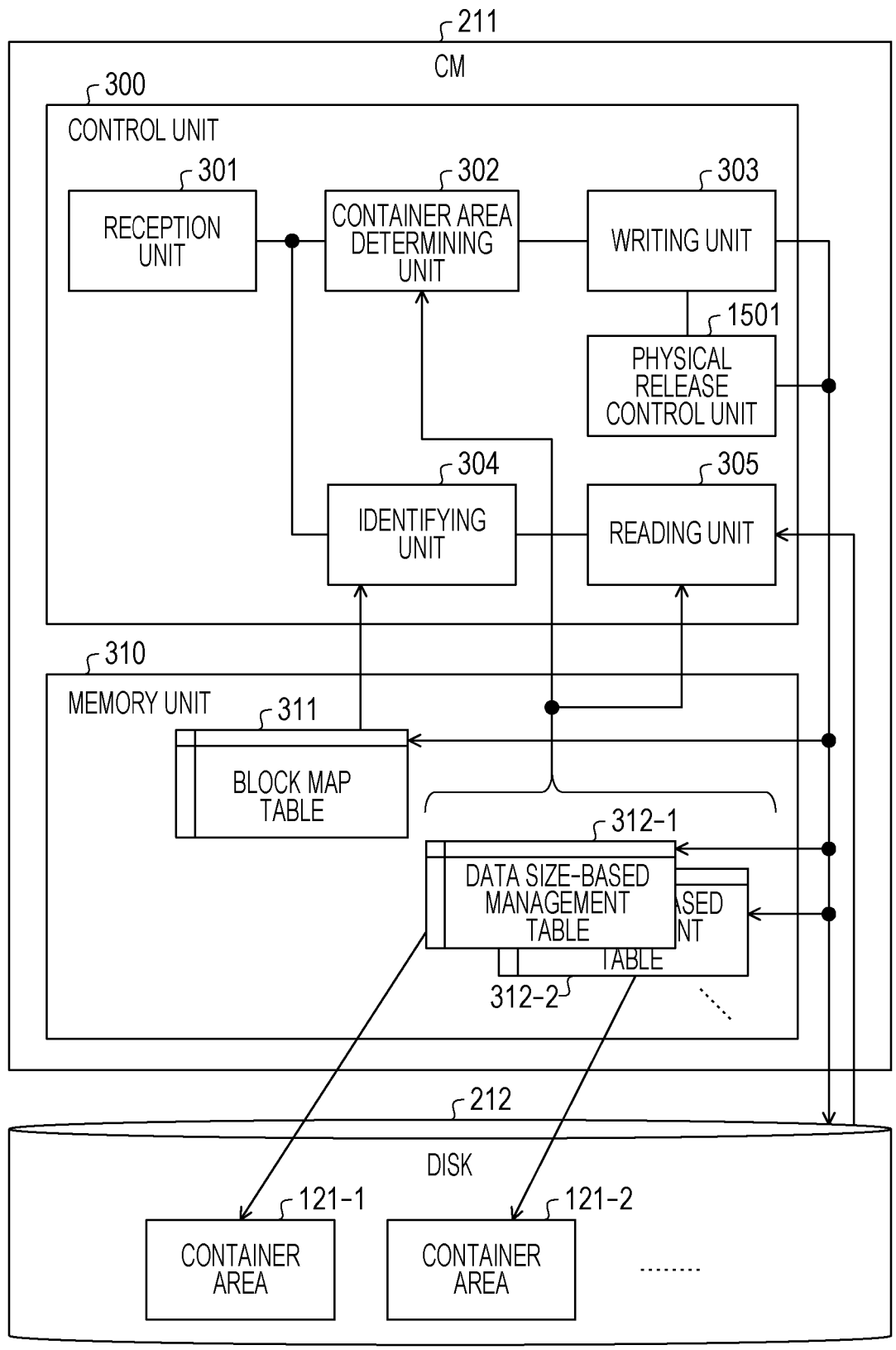
FIG. 15 illustrates an example of the functional configuration of a CM according to a second embodiment.

FIG. 15 illustrates an example of the functional configuration of the CM 211 according to the second embodiment. The CM 211 includes a control unit 300. The control unit 300 includes a reception unit 301, a container area determining unit 302, a writing unit 303, an identifying unit 304, a reading unit 305, and a physical release control unit 1501. The control unit 300 provides the functions of the above-described units by using a CPU 221 that executes the program stored in the storage device. The result of processing performed by each of the units is stored in the DRAM 222, the register of the CPU 221, or the cache memory of the CPU 221.

The physical release control unit 1501 controls physical release of a physical release unit area of the container area 121. As used herein, the term "physical release unit area" refers to an area obtained by dividing a plurality of data areas 122 of the container area 121 by the physically releasable unit. The physical release unit area is, for example, an area of 21 (MB).

More specifically, the physical release control unit 1501 determines whether the number of data areas 122 that are not in use in the container area 121 exceeds a threshold value α. Hereinafter, the number of data areas 122 that are not in use in the container area 121 is also referred to as the "number of unused areas". Note that the threshold value α may be set to any value. For example, the threshold value α is set to, for example, about 30% of the total number of data areas 122 of the container area 121.

For example, when the storage capacity of the container area 121 is 4 [GB] and the storage capacity of the data area 122 is 512 (bytes), the total number of data areas 122 of the container area 121 is "8388608". In this case, the threshold value α is set to, for example, the value "2768240", which is about 30% of the total number "8388608".

More specifically, for example, when the reference counter of any one of the data areas 122 of the container area 121 is decremented and reaches "0", the physical release control unit 1501 determines whether the number of unused areas of the container area 121 exceeds the threshold value α. In this manner, the physical release control unit 1501 determines whether the number of unused areas of the container area 121 exceeds the threshold value α when any one of the data areas 122 of the container area 121 becomes not in use.

In addition, when the number of unused areas in the container area 121 exceeds the threshold value α, the physical release control unit 1501 calculates the number of the data areas 122 in use for each of the plurality of physical release unit areas of the container area 121. Hereinafter, the number of data areas 122 in use included in the physical release unit area is also referred to as the "number of used areas".

More specifically, for example, the physical release control unit 1501 references the data size-based management table 312 for the container area 121 and calculates the number of used areas in each of the physical release unit areas of the container area 121. Note that the physical release control unit 1501 may identify which one of the data areas 122 is included in which physical release unit area by using the slot number in the data size-based management table 312, for example.

As an example, let A, B, C, D and E denote a plurality of physical release unit areas partitioned in units of 21 [MB] in ascending order of slot numbers. Then, the physical release control unit 1501 calculates the number of used areas in each of the physical release unit areas A to E.

In addition, the physical release control unit 1501 performs data migration between the physical release unit areas of the container area 121 based on the calculated number of used areas for each of the physical release unit areas. More specifically, for example, the physical release control unit 1501 first determines, from among the plurality of physical release unit areas of the container area 121, first and second physical release unit areas based on the calculated number of used areas for each of the physical release unit areas.

Note that the first physical release unit area is a physical release unit area serving as a data migration source. The second physical release unit area is a physical release unit area serving as a data migration destination. More specifically, for example, the physical release control unit 1501 may determine, from among the plurality of physical release unit areas of the container area 121, the physical release unit area having the smallest number of used areas as the first physical release unit area. In addition, the physical release control unit 1501 may determine, from among the plurality of physical release unit areas of the container area 121, the physical release unit area having the largest number of used areas as the second physical release unit area.

As an example, suppose that the numbers of used areas of the physical release unit areas A to E are calculated as follows:

Number of used areas of physical release unit area A="10",

Number of used areas of physical release unit area B="10",

Number of used areas of the physical release unit area C="8",

Number of used areas of physical release unit area D="11", and

Number of used areas of physical release unit area E="9".

In this case, for example, the physical release control unit 1501 determines, from among the physical release unit areas A to E, the physical release unit area C having the smallest number of used areas as the first physical release unit area. In addition, for example, the physical release control unit 1501 determines, from among the physical release unit areas A to E, the physical release unit area D having the largest number of used areas as the second physical release unit area.

Subsequently, the physical release control unit 1501 migrates the data in the used data area 122 included in the first physical release unit area into the unused data area 122 included in the second physical release unit area. The usage status of each of the data areas 122 included in the first and second physical release unit areas is identified from, for example, the data size-based management table 312.

In this manner, it is possible to migrate data between two physical release unit areas in the container area 121. At this time, since all of the data areas 122 in the container area 121 have the same data size, data migration is carried out more efficiently than in the case where the data sizes are not the same.

The physical release control unit 1501 may perform data migration between the first and second physical release unit areas when the number of used areas in the first physical release unit area is less than or equal to the number of data areas 122 that are not in use (the number of unused areas) included in the second physical release unit area. The number of unused areas in the physical release unit area is obtained by, for example, subtracting the number of used areas in the physical release unit area from the total number of data areas 122 included in the physical release unit area. That is, the physical release control unit 1501 may determine the second physical release unit area by selecting, from among the plurality of physical release unit areas of the container area 121, the one having the number of unused areas greater than or equal to the number of used areas of the first physical release unit area and having the number of used areas greater than that of the first physical release unit area. In this manner, the situation in which any data area 122 in use remains in the first physical release unit area does not occur.

However, when, as a result of data migration between the first and second physical release unit areas, a data area 122 in use remains in the first physical release unit area, the physical release control unit 1501 may determine a new second physical release unit area. At this time, the physical release control unit 1501 determines a new second physical release unit area from among the plurality of physical release unit areas of the container area 121 other than the physical release unit areas selected as the first and second physical release unit areas.

As an example, suppose that as a result of data migration from the physical release unit area C to the physical release unit area D among the physical release unit areas A to E, a data area 122 in use remains in the physical release unit area C. In this case, for example, the physical release control unit 1501 determines, as a new second physical release unit area, one among the physical release unit areas A, B, and E, which are the physical release unit areas A to E other than the physical release unit areas C and D. More specifically, for example, the physical release control unit 1501 determines, as a new second physical release unit area, the physical release unit area A having the largest number of used areas among the physical release unit areas A, B, and E. Note that when there are a plurality of physical release unit areas having the same number of used areas, the physical release control unit 1501 gives priority to, for example, the physical release unit area including a data area 122 having the smallest slot number.

When the migration of the data in the used data area 122 included in the first physical release unit area is completed, the physical release control unit 1501 releases the physical storage area corresponding to the first physical release unit area. For example, the physical storage area corresponding to the first physical release unit area is a physical storage area in the disk 212 allocated to the first physical release unit area.

More specifically, for example, after migration of data in all the data areas 122 in use included in the first physical release unit area is completed, the physical release control unit 1501 zeros (clears) the physical storage area allocated to the first physical release unit area in the disk 212. Thereafter, the physical release control unit 1501 updates control information (not illustrated) related to the allocation of the physical storage area of the container area 121. More specifically, for example, the physical release control unit 1501 clears the physical address of the physical storage area associated with the first physical release unit area.

In this manner, it is possible to physically release the first physical release unit area containing no used data area 122 due to the data migration between the physical release unit areas in the container area 121.

In addition, when migration of the data in all the data areas 122 in use included in the first physical release unit area is completed, the physical release control unit 1501 may determine new first and second physical release unit areas. At this time, a physical release unit area from which the data in all the data areas 122 in use have been migrated is excluded from the determination (selection).

Furthermore, when migrating the data in the data areas 122 in use included in the first physical release unit area into the data areas 122 not in use included in the second physical release unit area, the physical release control unit 1501 updates the block map table 311 and the data size-based management table 312.

More specifically, for example, the physical release control unit 1501 updates, for the migrated data, the physical storage slot number in the block map table 311 with the physical storage slot number of the migration destination data area 122. In addition, the physical release control unit 1501 updates the data area usage status and the reference counter in the data size-based management table 312 for each of the data areas 122 in the migration source and the migration destination. More specifically, for example, the physical release control unit 1501 sets the data area usage status and the reference counter in the data size-based management table 312 for the migration source data area 122 to "not in use" and "0", respectively. Furthermore, the physical release control unit 1501 sets the data area usage status and the reference counter in the data size-based management table 312 for the migration destination data area 122 to "in use" and the value of the reference counter for the destination source data area 122, respectively.

When releasing the physical release unit area, the physical release control unit 1501 may change the usage status of each of the data areas 122 included in the physical release unit area to "empty". In this manner, for example, when reallocating the physical storage area, it is possible for the CM 211 to determine the necessity of reallocation only by determining whether the first data area 122 is "empty". When the usage status of each of all the data areas 122 is not changed and is left to "not in use", the CM 211 reallocates the physical storage area after, for example, determining that the usage statuses of all the data areas 122 are "not in use". Thus, the load on the CM 211 increases.

Example of Physical Release of Physical Release Unit Area

An example of physical release of a physical release unit area in the container area 121 is described below with reference to FIGS. 16 to 19. In this example, an example of physical release of a physical release unit area is described with reference to a container area 121 having a container ID of "x" whose usage status has greatly changed due to a change in the data pattern trend.

Figure 16:
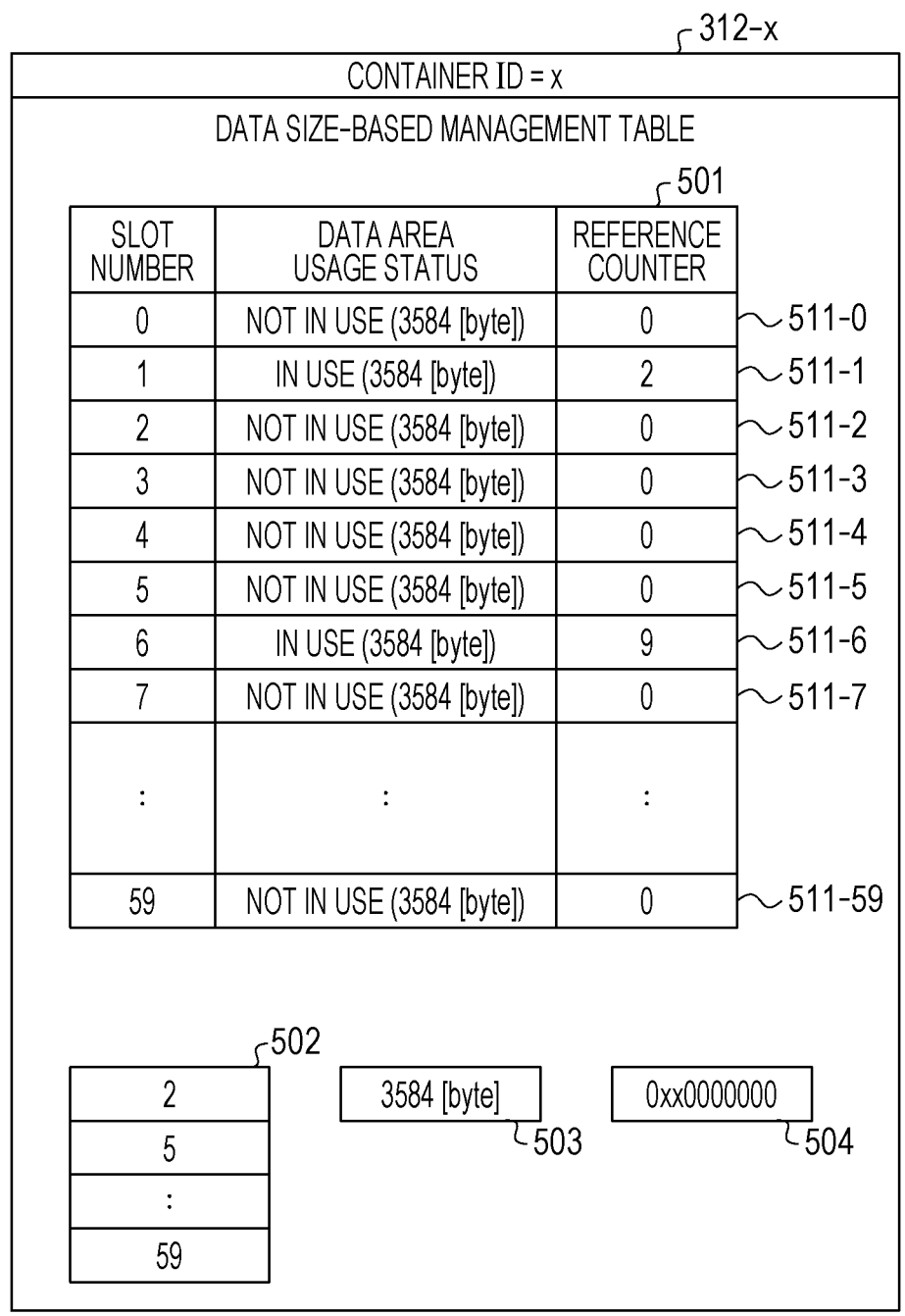
FIG. 16 illustrates an example of the details of information stored in a data size-based management table.

FIG. 16 illustrates an example of the details of the information stored in a data size-based management table 312-*x*. As illustrated in FIG. 16, the data size-based management table 312-*x* has a container ID, container information 501, a not-in-use queue 502, a container management size 503, and a container start address 504.

The container information 501 has records 511-0 to 511-59. That is, the container area 121 having a container ID of "x" has 60 data areas 122 whose slot numbers are "0" to "59".

Figure 17:
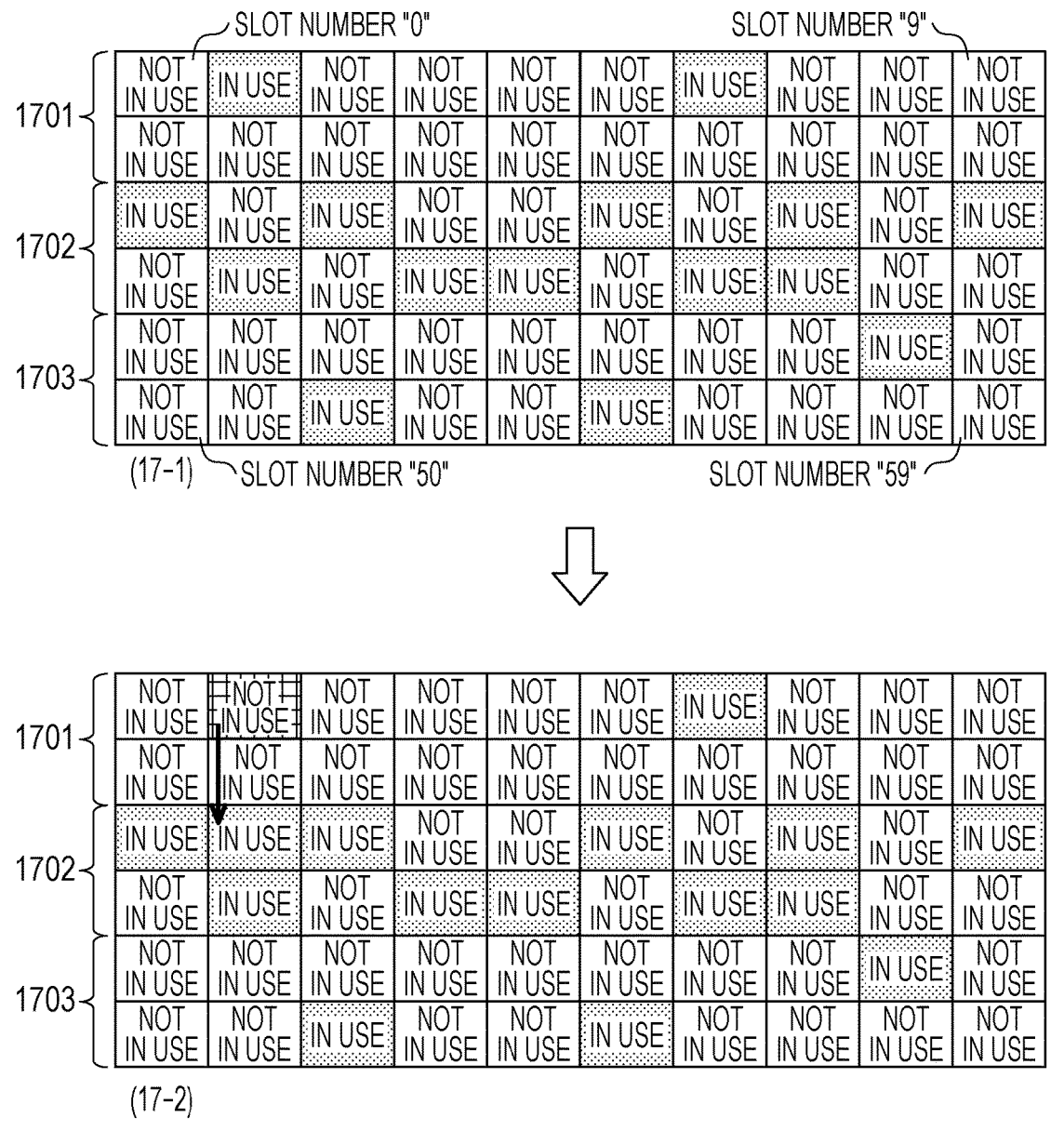
Figure 18:
FIG. 18 illustrates an example of physical release (part 2) of a physical release unit area in the container area.
Figure 19:
FIG. 19 illustrates an example of physical release (part 3) of a physical release unit area in the container area.

FIGS. 17 to 19 illustrate an example of physical release of the physical release unit area in the container area 121. In FIG. 17, the usage status of each of the data areas 122 in the container area 121 having a container ID of "x" is illustrated. In FIG. 17, the data area 122 having a slot number of "0" is located in the upper left corner, and the other data areas 122 are arranged such that the slot number increases from the left to right in each row.

For example, in the top row, ten data areas 122 corresponding to slot numbers "0" to "9" are arranged from the left to right. In addition, a plurality of physical release unit areas in the container area 121 having a container ID of "x" are referred to as "physical release unit areas 1701 to 1703" which are obtained by partitioning the data areas 122 into sets of 20 data areas 122. Furthermore, the threshold value α is set to 20 (α=20).

State (17-1) in FIG. 17 indicates the usage status of each of the data areas 122 in the container area 121 having a container ID of "x" indicated by the data size-based management table 312-*x* illustrated in FIG. 16. In this case, the physical release control unit 1501 references the data size-based management table 312-x and determines whether the number of unused areas in the container area 121 having a container ID of "x" exceeds the threshold value α.

In this example, the number of unused areas in the container area 121 having a container ID of "x" is "45". Accordingly, the physical release control unit 1501 determines that the number of unused areas in the container area 121 having a container ID of "x" exceeds the threshold value α. Subsequently, the physical release control unit 1501 references the data size-based management table 312-x and calculates the number of used areas in each of the physical release unit areas 1701 to 1703.

In this example, the number of used areas in the physical release unit area 1701 is "2", the number of used areas in the physical release unit area 1702 is "10", and the number of used areas in the physical release unit area 1703 is "3". In this case, the physical release control unit 1501 determines the physical release unit area 1701 having the smallest number of used areas as the first physical release unit area. In addition, the physical release control unit 1501 determines the physical release unit area 1702 having the largest number of used areas as the second physical release unit area.

Thereafter, the physical release control unit 1501 migrates the data in the used data area 122 included in the physical release unit area 1701 into the unused data area 122 included in the physical release unit area 1702. At this time, the physical release control unit 1501 migrates the data into an unused data area 122 included in the physical release unit area 1702 and having a small slot number.

In state (17-2) illustrated in FIG. 17, the data of the data area 122 included in the physical release unit area 1701 and having a slot number of "1" is migrated into the data area 122 included in the physical release unit area 1702 and having a slot number of "21".

In state (17-3) illustrated in FIG. 18, the data in the data area 122 included in the physical release unit area 1701 and having a slot number of "6" is migrated into the data area 122 included in the physical release unit area 1702 and having a slot number of "23".

After migration of the data in all of the in-use data areas 122 included in the physical release unit area 1701 is completed, the physical release control unit 1501 determines new first and second physical release unit areas. In this example, the number of used areas of the physical release unit area 1702 after completion of the data migration is "12", and the number of used areas of the physical release unit area 1703 is "3".

In this case, the physical release control unit 1501 determines the physical release unit area 1703 having the smallest number of used areas as the first physical release unit area. In addition, the physical release control unit 1501 determines the physical release unit area 1702 having the largest number of used areas as the second physical release unit area. Note that the physical release unit area 1701 for which data migration has been completed is excluded from the determination target.

Thereafter, the physical release control unit 1501 migrates the data in the used data area 122 included in the physical release unit area 1703 into the unused data area 122 included in the physical release unit area 1702. At this time, the physical release control unit 1501 migrates the data into an unused data area 122 included in the physical release unit area 1702 and having a small slot number.

In state (17-4) illustrated in FIG. 18, the data in the data area 122 included in the physical release unit area 1703 and having a slot number of "48" is migrated into the data area 122 included in the physical release unit area 1702 and having a slot number of "24".

Similarly, the data in the data areas 122 included in the physical release unit area 1703 and having slot numbers of "52" and "55" are migrated into the data areas 122 included in the physical release unit area 1702 and having slot numbers "26" and "28", respectively, and, thus, state (17-5) illustrated in FIG. 19 occurs.

Thereafter, the physical release control unit 1501 releases the physical storage area corresponding to the physical release unit area for which migration of the data in all the used data areas 122 has been completed. In state (17-6) illustrated in FIG. 19, the physical storage areas corresponding to the physical release unit areas 1701 and 1703 are released.

In this manner, by performing garbage collection on the container area 121 having a container ID of "x" in which the number of data areas 122 not in use is increased due to a change in the data pattern trend, the use amount of the physical storage area is reduced to one-third of its original use amount. The physically released area is usable for other container areas 121 or the like and, thus, the use efficiency of the disk 212 increases.

In addition, since all of the data areas 122 in the container area 121 have the same data size, data migration is performed more efficiently than in the case where the data sizes are not the same. For example, when the data sizes are not the same, all the data in use are migrated. However, according to the example illustrated in FIGS. 17 to 19, the number of writing operations is reduced to five.

Procedure for Various Processes Performed by CM

The procedures for various processes performed by the CM 211 according to the second embodiment are described below. The procedure for the write I/O reception process performed by the CM 211 according to the second embodiment is described first. Note that the procedures of processes other than specific part of the reference counter increment/decrement process in step S1113 illustrated in FIG. 11B are the same as those of the write I/O reception process performed by the CM 211 according to the first embodiment. Accordingly, the procedure for only part of the reference counter increment/decrement process that differs from that performed by the CM 211 according to the first embodiment is described.

Figure 20:
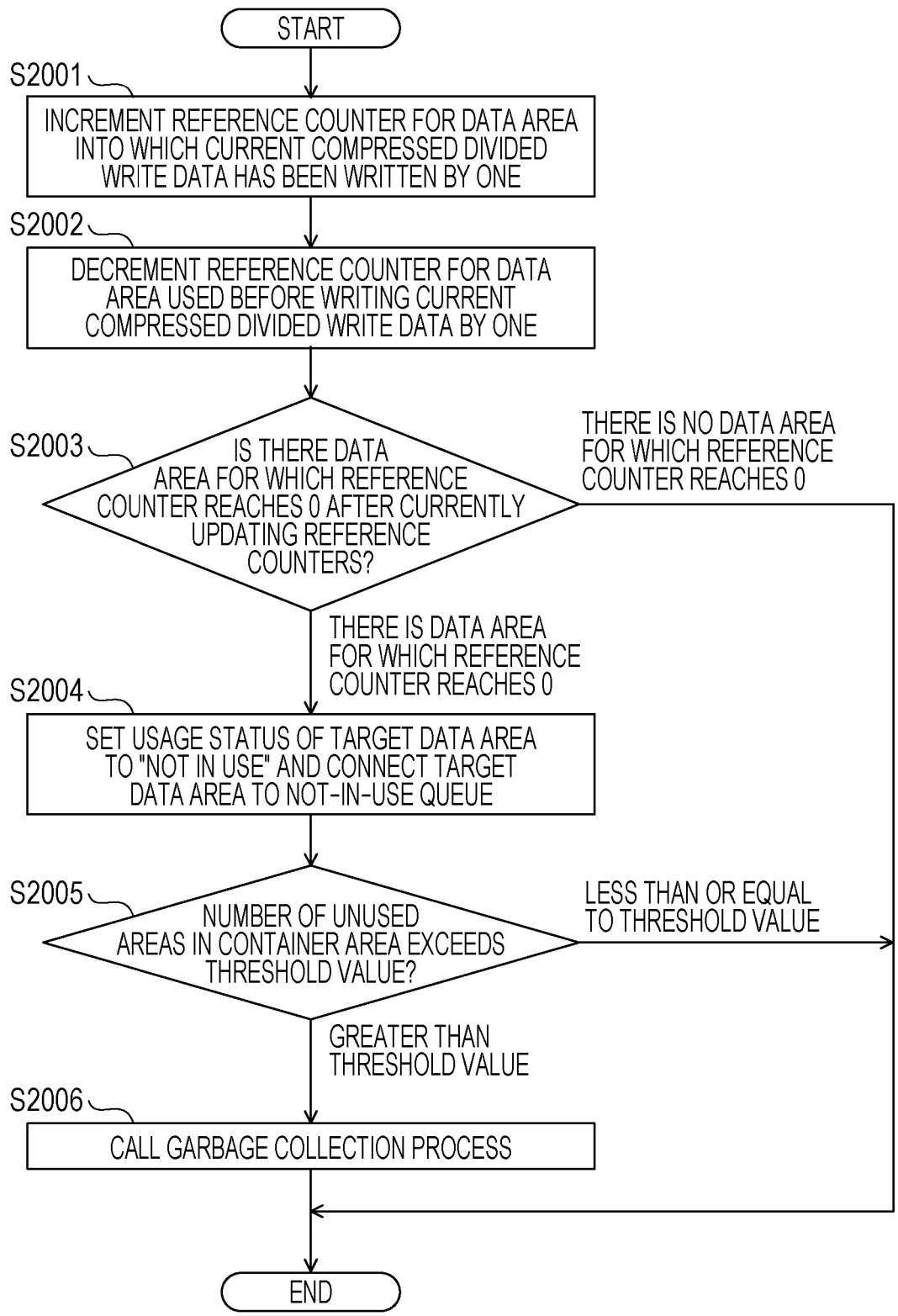
FIG. 20 is a flowchart illustrating an example of the procedure for the reference counter increment/decrement process according to the second embodiment.

FIG. 20 is a flowchart illustrating an example of the procedure for the reference counter increment/decrement process according to the second embodiment. The CM 211 increments the reference counter for the data area 122 into which the current compressed divided write data wdsc has been written by one (step S2001). In addition, the CM 211 decrements the reference counter for the data area 122 used before writing the current compressed divided write data by one (step S2002). Thereafter, the CM 211 determines whether there is a data area 122 for which the reference counter reaches 0 after updating the current reference counter (step S2003).

When there is a data area 122 for which the reference counter reaches 0 (step S2003: there is a data area for which the reference counter reaches 0), the CM 211 sets the usage status of the target data area 122 to "not in use" and connects the target data area 122 to the not-in-use queue (step S2004).

Subsequently, the CM 211 determines whether the number of unused areas in the target container area 121 exceeds the threshold value α (step S2005). Note that the target container area 121 is the container area 121 having therein the target data area 122 that is connected to the not-in-use queue in step S2004.

When the number of unused areas in the target container area 121 exceeds the threshold value α (step S2005: greater than the threshold value), the CM 211 calls the garbage collection process (step S2006). The particular procedure for the garbage collection process is described below with reference to FIGS. 21 and 22.

After completion of the process in step S2006 or when there is no data area 122 for which the reference counter has become 0 (step S2003: no data area for which the reference counter is 0) or the number of unused areas in the target container area 121 is smaller than or equal to the threshold value α (step S2005: less than or equal to the threshold value), the CM 211 ends the reference counter increment/decrement process.

In this manner, it is possible to determine whether to perform the garbage collection on the container area 121 when the number of the unused data areas 122 in the container area 121 increases.

Figure 21:
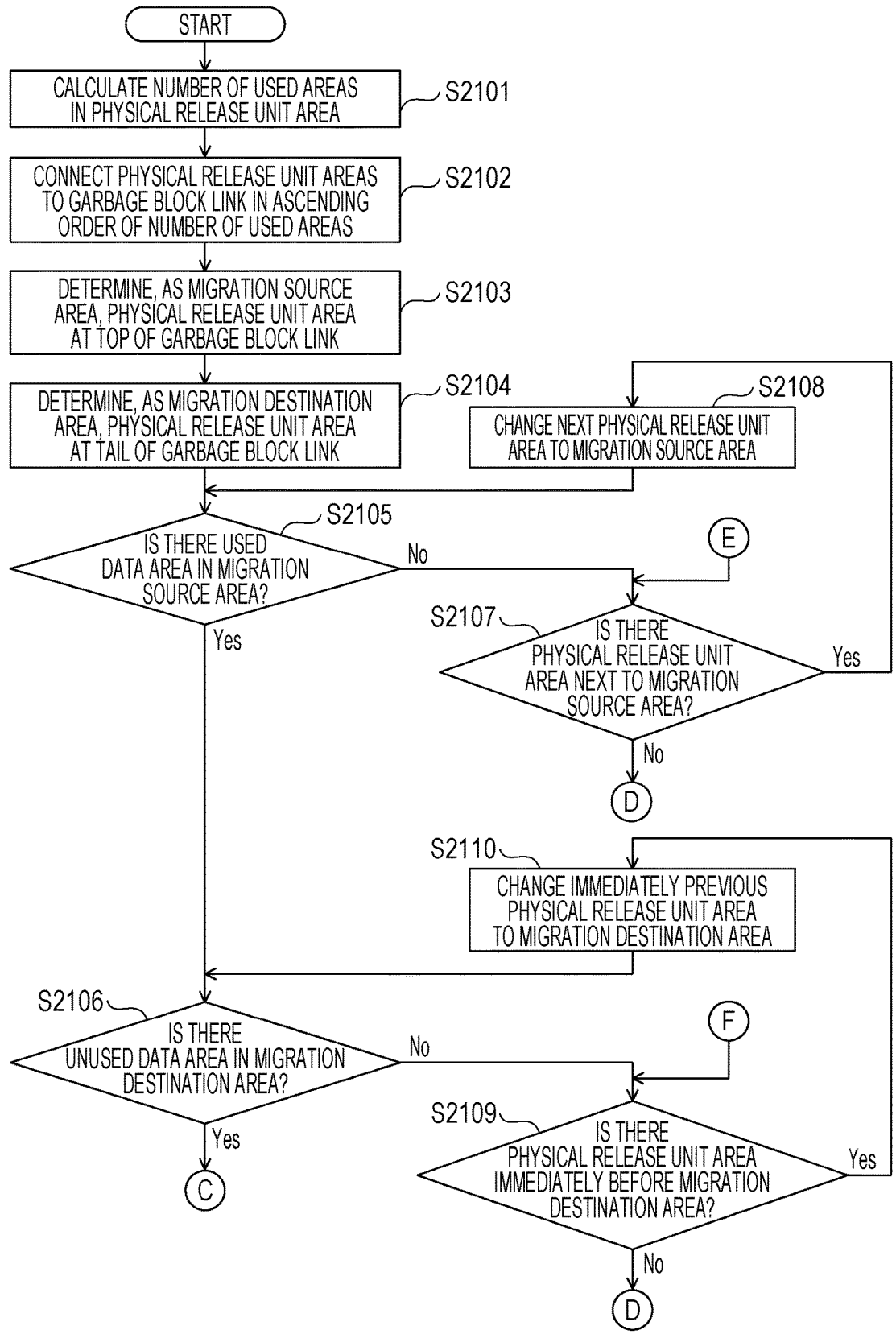
FIG. 21 is a flowchart illustrating an example of the procedure for a garbage collection process (part 1) according to the second embodiment.
Figure 22:
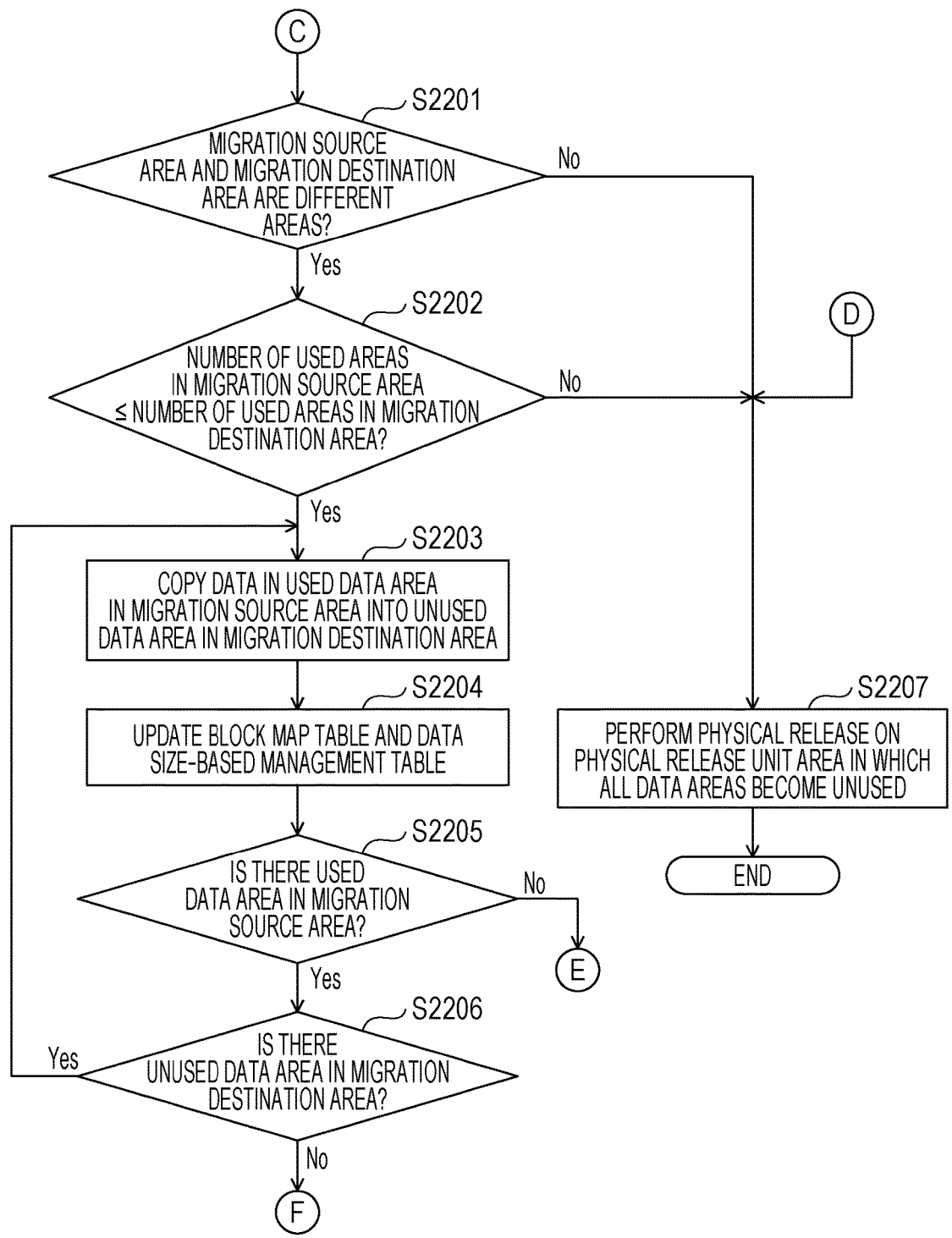
FIG. 22 is a flowchart illustrating an example of the procedure for the garbage collection process (part 2) according to the second embodiment.

FIGS. 21 and 22 are flowcharts illustrating an example of the procedure for the garbage collection process according to the second embodiment. As illustrated in the flowchart of FIG. 21, the CM 211 references the data size-based management table 312 for the target container area 121 and calculates the number of used areas in the physical release unit area of the target container area 121 first (step S2101).

Subsequently, the CM 211 sequentially connects the physical release unit areas of the target container area 121 to a garbage block link in ascending order of the calculated number of used areas (step S2102). Thereafter, the CM 211 determines, as the migration source area, the physical release unit area at the top of the garbage block link (step S2103). The migration source area corresponds to the above-described first physical release unit area.

Note that each of the areas connected to the garbage block link has 'prev' information and 'next' information so that the immediately previous area and the next area are identifiable.

Subsequently, the CM 211 determines, as the migration destination area, the physical release unit area at the tail of the garbage block link (step S2104). The migration destination area corresponds to the above-described second physical release unit area. Subsequently, the CM 211 determines whether there is a used data area 122 in the determined migration source area (step S2105).

When there is a used data area 122 in the migration source area (step S2105: Yes), the CM 211 determines whether there is an unused data area 122 in the determined migration destination area (step S2106). When there is an unused data area 122 in the migration destination area (step S2106: Yes), the processing performed by the CM 211 proceeds to step S2201 illustrated in FIG. 22.

However, when, in step S2105, there is no used data area 122 in the migration source area (step S2105: No), the CM 211 determines whether there is a physical release unit area next to the migration source area by using the 'next' information of the migration source area (step S2107).

When there is the next physical release unit area (step S2107: Yes), the CM 211 changes the next physical release unit area to the migration source area (step S2108), and the processing proceeds to step S2105. However, when there is no next physical release unit area (step S2107: No), the processing performed by the CM 211 proceeds to step S2207 illustrated in FIG. 22.

In step S2106, when there is no unused data area 122 in the migration destination area (step S2106: No), the CM 211 determines whether there is a physical release unit area immediately before the migration destination area by using the 'prev' information of the migration destination area (step S2109).

When there is the immediately previous physical release unit area (step S2109: Yes), the CM 211 changes the immediately previous physical release unit area to the migration destination area (step S2110), and the processing performed by the CM 211 proceeds to step S2106. However, when there is no immediately previous physical release unit area (step S2109: No), the processing performed by the CM 211 proceeds to step S2207 illustrated in FIG. 22.

In the flowchart illustrated in FIG. 22, the CM 211 determines whether the migration source area and the migration destination area are different areas first (step S2201). When the migration source area and the migration destination area are different areas (step S2201: Yes), the CM 211 determines whether the number of used areas in the migration source area is less than or equal to the number of used areas in the migration destination area (step S2202).

When the number of used areas in the migration source area is less than or equal to the number of used areas in the migration destination area (step S2202: Yes), the CM 211 migrates the data in the used data area 122 included in the migration source area into the unused data area 122 included in the migration destination area (step S2203).

Subsequently, the CM 211 updates the block map table 311 and the data size-based management table 312 (step S2204). Thereafter, the CM 211 determines whether there is a used data area 122 in the migration source area (step S2205).

When there is no used data area 122 in the migration source area (step S2205: No), the processing performed by the CM 211 proceeds to step S2107 illustrated in FIG. 21. However, when there is a used data area 122 in the migration source area (step S2205: Yes), the CM 211 determines whether there is an unused data area 122 in the migration destination area (step S2206).

When there is no unused data area 122 in the migration destination area (step S2206: No), the processing performed by the CM 211 proceeds to step S2109 illustrated in FIG. 21. However, when there is an unused data area 122 in the migration destination area (step S2206: Yes), the processing performed by the CM 211 returns to step S2203.

When, in step S2201, the migration source area and the migration destination area are the same area (step S2201: No) or when, in step S2202, the number of used areas in the migration source area is greater than the number of used areas in the migration destination area (step S2202: No), the processing performed by the CM 211 proceeds to step S2207. In this manner, the following situation does not occur: data migration is performed even when the number of used areas in the migration source area is greater than the number of used areas in the migration destination area.

Thereafter, the CM 211 performs physical release on the physical release unit area in which all the data areas 122 are unused (step S2207) and ends the series of processes according to the flowchart. In this manner, by performing garbage collection on a container-by-container basis, the areas that are not used due to a change in data pattern trend are physically released.

As described above, the CM 211 according to the second embodiment determines whether the number of unused areas in the container area 121 exceeds the threshold value α. More specifically, for example, when the reference counter for any one of the data areas 122 in the container area 121 is decremented and reaches "0", the CM 211 determines whether the number of unused areas in the container area 121 exceeds the threshold value α.

As a result, it is possible to determine whether the number of unused areas in the container area 121 exceeds the threshold value α when any one of the data areas 122 in the container area 121 becomes unused. In other words, when the number of the unused data areas 122 in the container area 121 increases, it is possible to determine whether garbage collection is to be performed on the container area 121.

In addition, when the number of unused areas in the container area 121 exceeds the threshold value α, the CM 211 calculates, for each of the plurality of physical release unit areas of the container area 121, the number of used areas included in the physical release unit area. Furthermore, by using the calculated number of used areas for each of the physical release unit areas, the CM 211 migrates the data in the used data areas 122 included in the first physical release unit area among the plurality of physical release unit areas into the unused data areas 122 included in the second physical release unit area. Thereafter, upon completion of the migration of the data in the used data areas 122 included in the first physical release unit area, the CM 211 releases the physical storage area corresponding to the first physical release unit area.

As a result, when the data pattern trend changes and, thus, the number of unused areas in the container area 121 exceeds the threshold value α, it is possible that data migration is performed between the physical release unit areas in the container area 121 to generate a grouped unused area and, thereafter, physical release (garbage collection) is performed.

In addition, the CM 211 may determine, from among the plurality of physical release unit areas of the container area 121, the one having the smallest number of used areas as the first physical release unit area and determines the one having the largest number of used areas as the second physical release unit area. As a result, it is possible to efficiently generate a grouped unused areas in the container area 121.

Furthermore, when the number of used areas in the first physical release unit area is less than or equal to the number of unused areas in the second physical release unit area, the CM 211 may migrate the data in the data area 122 in use in the first physical release unit area into a data area 122 not in use included in the second physical release unit area. As a result, the situation in which all the data are not migrated into the second physical release unit area and, thus, some data areas 122 in use remain in the first physical release unit area does not occur.

In the above-described manner, according to the CM 211 of the second embodiment, it is possible to improve the usage efficiency of the disk 212 by performing garbage collection on the container area 121 in which the number of the unused areas increases due to a change in the data pattern trend. In addition, since all of the data areas 122 included in the container area 121 have the same size, it is possible to migrate the data more efficiently than in the case where the data sizes are not the same. Therefore, it is possible to perform garbage collection while reducing the influence on the life of an SSD or the like used in the disk 212.

The storage control method according to the present embodiment may be provided by executing a program pre-stored on a computer, such as a personal computer or a workstation. The storage control program is recorded in a computer-readable recording medium, such as a hard disk, a flexible disk, a compact disc-read only memory (CD-ROM), or a digital versatile disk (DVD), and is read out of the recording medium by the computer. Alternatively, the storage control program may be distributed via a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An apparatus comprising:
a memory configured to store management information including first and second management information, and logical address information used to control a storage including a first storage area and a second storage area, the first storage area including a first set of data areas allocated from the first storage area, each of which has a first size that is an integer multiple of an access unit of the storage, the second storage area including a second set of data areas allocated from the second storage area, each of which has a second size that is an integer multiple of the access unit of the storage and differs from the first size, the first management information including first identification information that identifies a physical address of each of the first set of data areas in the first storage area and first status information indicating a usage status of each of the first set of data areas, the second management information including second identification information that identifies a physical address of each of the second set of data areas in the second storage area and second status information indicating a usage status of each of the second set of data areas, the logical address information storing target identification information identifying a target data area that is a data area among the first and second sets of data areas, into which target data obtained by compressing write data to be written into the storage has been written, in association with a logical address of the write data; and
a processor coupled to the memory and configured to:
upon reception of the write data and a logical address of the write data, identify target management information that is one of the first and second management information corresponding to a size greater than or equal to a size of the target data,
write the target data into an unused data area of a target set of data areas that is one of the first and second sets of data areas corresponding to a target storage area, the target storage area being one of the first and second storage areas corresponding to the identified target management information, and
store, in the logical address information, information identifying a physical address of the unused data area in association with a logical address of the write data,
when a number of unused data areas among a given set of data areas, which is any one of the first and second sets of data areas, exceeds a given threshold, the processor;
calculates, for each of a plurality of physical release unit areas which are obtained by dividing the given set of data areas into unit areas that are each physically releasable, a number of used data areas included in each physical release unit area, migrates data in the used data areas included in a first physical release unit area among the plurality of physical release unit areas to unused data areas included in a second physical release unit area, based on the calculated number of used data areas for each physical release unit area.

2. The apparatus of claim 1, wherein:

each of the first and second storage area is a storage area that is accessed by a head, each of the first and second sets of data areas forms consecutive data areas, and when there exist a plurality of unused data areas among a target set of data areas that is one of the first and second sets of data areas in the target storage area identified by the target management information, the target data is written into an unused data area that is positioned at a head of unused data areas among the target set of data areas.

3. The apparatus of claim 1, wherein:

each of the first and second sets of data areas forms consecutive data areas;

the first identification information of the first management information includes a physical address identifying a first head data area that is a data area positioned at a head of the first set of data areas, a first ordinal number that is an ordinal number of each data area from the head data area within the first set of data areas, and the first size;

the second identification information of the second management information includes a physical address identifying a second head data area that is a data area positioned at a head of the second set of data areas, a second ordinal number of each data area from the second head data area within the second set of data areas, and the second size;

the logical address information stores the target management information, an ordinal number of an data area into which the target data has been written, from a target head data area that is a data area positioned at a head of the target set of data areas, and a logical address of the write data, in association with each other; and upon reception of a logical address within a given size of a read range, the processor, with reference to the logical address information, identifies the target management information and ordinal numbers corresponding to logical addresses within the read range, calculates physical addresses of data areas into which data corresponding to the logical addresses of the read range have been written, based on a physical address of a target head data area positioned at a head of the target set of data areas identified by the target management information, the identified ordinal numbers, and a size corresponding to the target management information, and reads out data at the physical addresses of the storage.

4. The apparatus of claim 1, wherein:

each of the first and second sets of data areas forms consecutive data areas;

the first identification information of the first management information includes a physical address identifying a first head data area that is a data area positioned at a head of the first set of data areas, a first ordinal number that is a n ordinal number of each data area from the head data area within the first set of data areas, and the first size;

the second identification information of the second management information includes a physical address identifying a second head data area that is a data area positioned at a head of the second set of data areas, a second ordinal number of each data area from the second head data area within the second set of data areas, and the second size;

the logical address information stores the target management information, an ordinal number of an data area, into which the target data has been written, from a target head data area that is a data area positioned at a head of the target set of data areas, and a logical address of the write data, in association with each other; and when logical management information that is one of the first and second management information corresponding to a logical address of the target data in the logical address information is identical to the target management information, the processor writes the target data into a target data area that is a data area indicated by the ordinal number corresponding to the logical address of the write data in the logical address information among the target set of data areas.

5. The apparatus of claim 4, wherein:

the first set of data areas managed by the first management information store pieces of data that are not overlapped with each other;

the first management information further includes, in association with each of the first set of data areas, a first reference count indicating a number of logical addresses referencing each of the first set of data areas;

the second set of data areas managed by the second management information store pieces of data that are not overlapped with each other;

the second management information further includes, in association with each of the second set of data areas, a second reference count indicating a number of logical addresses referencing each of the second set of data areas; and when the logical management information is identical to the target management information, and when a target reference count, which is one of the first and second reference counts indicating a number of logical addresses referencing a data area indicated by the ordinal number corresponding to the logical address of the write data in the logical address information, is one, the processor writes the target data into the target data area.

6. The apparatus of claim 1, wherein upon completion of migration of the data in the used data areas included in the first physical release unit area, releases a physical storage area corresponding to the first physical release unit area.

7. The apparatus of claim 6, wherein:

the first physical release unit area is a physical release unit area having a smallest number of used areas among the plurality of physical release unit areas, and the second physical release unit area is a physical release unit area having a largest number of used areas among the plurality of physical release unit areas.

8. The apparatus of claim 6, wherein, when the number of used areas in the first physical release unit area is less than or equal to the number of unused data areas included in second physical release unit area, the processor migrates the data in the used data areas included in the first physical release unit area to the unused data areas included in the second physical release unit area.

9. The apparatus of claim 6, wherein upon completion of migration of the data in the used data areas included in the first physical release unit area to the unused data areas included in the second physical release unit area, the processor updates the management information for the given set of data areas and the logical address information.

10. A non-transitory, computer-readable recording medium having stored therein a program for causing a computer to execute a process comprising:

providing management information including first and second management information, and logical address information used to control a storage including a first storage area and a second storage area, the first storage area including a first set of data areas allocated from the first storage area, each of which has a first size that is an integer multiple of an access unit of the storage, the second storage area including a second set of data areas allocated from the second storage area, each of which has a second size that is an integer multiple of the access unit of the storage and differs from the first size, the first management information including first identification information that identifies a physical address of each of the first set of data areas in the first storage area and first status information indicating a usage status of each of the first set of data areas, the second management information including second identification information that identifies a physical address of each of the second set of data areas in the second storage area and second status information indicating a usage status of each of the second set of data areas, the logical address information storing target identification information identifying a target data area that is a data area among the first and second sets of data areas, into which target data obtained by compressing write data to be written into the storage has been written, in association with a logical address of the data;

upon reception of the write data and a logical address of the write data, identifying target management information that is one of the first and second management information corresponding to a size greater than or equal to a size of the target data;

writing the target data into an unused data area of a target set of data areas that is one of the first and second sets of data areas corresponding to a target storage area, the target storage area being one of the first and second storage areas corresponding to the identified target management information; and storing, in the logical address information, information identifying a physical address of the unused data area in association with a logical address of the write data, when a number of unused data areas among a given set of data areas, which is any one of the first and second sets of data areas, exceeds a given threshold, the processor;

calculates, for each of a plurality of physical release unit areas which are obtained by dividing the given set of data areas into unit areas that are each physically releasable, a number of used data areas included in each physical release unit area, migrates data in the used data areas included in a first physical release unit area among the plurality of physical release unit areas to unused data areas included in a second physical release unit area, based on the calculated number of used data areas for each physical release unit area.

11. The non-transitory, computer-readable recording medium of claim 10, wherein:

each of the first and second sets of data areas forms consecutive data areas;

the first identification information of the first management information includes a physical address identifying a first head data area that is a data area positioned at a head of the first set of data areas, a first ordinal number that is an ordinal number of each data area from the head data area within the first set of data areas, and the first size;

the second identification information of the second management information includes a physical address identifying a second head data area that is a data area positioned at a head of the second set of data areas, a second ordinal number of each data area from the second head data area within the second set of data areas, and the second size;

the logical address information stores the target management information, an ordinal number of an data area into which the target data has been written, from a target head data area that is a data area positioned at a head of the target set of data areas, and a logical address of the write data, in association with each other; and the process further includes:

upon reception of a logical address within a given size of a read range, with reference to the logical address information, identifying the target management information and ordinal numbers corresponding to logical addresses within the read range, calculating physical addresses of data areas into which data corresponding to the logical addresses of the read range have been written, based on a physical address of a target head data area positioned at a head of the target set of data areas identified by the target management information, the identified ordinal numbers, and a size corresponding to the target management information, and reading out data at the physical addresses of the storage.

* * * * *